United States Patent
Kady

(10) Patent No.: US 6,431,580 B1
(45) Date of Patent: Aug. 13, 2002

(54) ACCESSORIES FOR A COLLAPSIBLE ROLLING CADDY

(76) Inventor: Darren J. Kady, 5111 Stony Point Rd., Barboursville, VA (US) 22933

( * ) Notice: Subject to any disclaimer, the term of this patent is extended or adjusted under 35 U.S.C. 154(b) by 0 days.

(21) Appl. No.: 09/320,272

(22) Filed: May 29, 1999

Related U.S. Application Data
(60) Provisional application No. 60/121,376, filed on Feb. 25, 1999.

(51) Int. Cl.⁷ .................................................. B62B 1/00
(52) U.S. Cl. ..................................................... 280/655
(58) Field of Search ............................ 280/33.998, 639, 280/40, 651, 652, 659, 47.24, 47.26, 47.35, 37, 655, 655.1, 42, 47.18, 47.19, 47.27, 47.2, 47.315, 47.33, 47.131; 190/39, 115, 107, 109, 110, 111, 114, 102, 26, 27; 206/425, 372, 373, 371, 215; 220/6, 4.29, 769, 735, 212, 751, 528

(56) References Cited

U.S. PATENT DOCUMENTS

| | | | |
|---|---|---|---|
| 3,492,016 A | * 1/1970 | O'Connor et al. | 280/47.26 |
| 4,243,340 A | * 1/1981 | MacGregor | 40/312 |
| 4,542,777 A | * 9/1985 | Benson | 150/52 B |
| 4,793,508 A | * 12/1988 | Thompson | 220/22.1 |
| 4,864,334 A | * 9/1989 | Ellis | 354/81 |
| 4,953,878 A | * 9/1990 | Sbragria | 280/30 |
| 5,464,237 A | * 11/1995 | Saporiti | 280/30 |
| 5,570,895 A | * 11/1996 | McCue et al. | 280/47.19 |
| 5,961,134 A | * 10/1999 | Congleton et al. | 280/47.18 |
| 6,010,145 A | * 1/2000 | Liu | 280/655.1 |
| 6,050,660 A | * 4/2000 | Gurley | 312/249.1 |
| 6,073,737 A | * 6/2000 | Kang | 190/18 A |
| 6,073,943 A | * 6/2000 | Serrault | 280/47.26 |
| 6,193,247 B1 | * 2/2001 | Spear et al. | 280/33.998 |

FOREIGN PATENT DOCUMENTS

| | | | |
|---|---|---|---|
| GB | 2246545 A | 2/1992 | 280/651 |

* cited by examiner

Primary Examiner—Paul N. Dickson
Assistant Examiner—Gerald Klebe
(74) Attorney, Agent, or Firm—Sheldon H. Parker

(57) ABSTRACT

Improvement to a prior art collapsible wheeled caddy are disclosed to enable the caddy to be used for specialized purposes. A hinged lid is attached to the edge of the front panel to close the caddy top while lying proximate the front panel when open. The front panel can be recessed to receive the lid and preferably, arcs in the lid are dimensioned to accommodate the handles. The recess can accommodate one or more storage members, including a storage panel that has been dimensioned to be affixed within the recess. Hangers are configured to interact with the sides of the caddy to accommodate hanging items such as file folders. A back panel can be used containing retaining members to removably affix items to the panel. A stacking caddy is disclosed that has a handle recess and retaining member dimensioned to receive the wheeled handles. Caddy receiving channels are placed in the bottom of the stacking caddy to receive the edges of the wheeled caddy. A spacer unit can be used to stack two wheeled, or a wheeled and stacking, caddys incorporating wheel wells, alignment prongs and locks to prevent separation and lateral movement. A cover can be provided for one or more of the caddys to protect the contents. A container case can also be affixed to the front or back panels of the caddy.

35 Claims, 29 Drawing Sheets

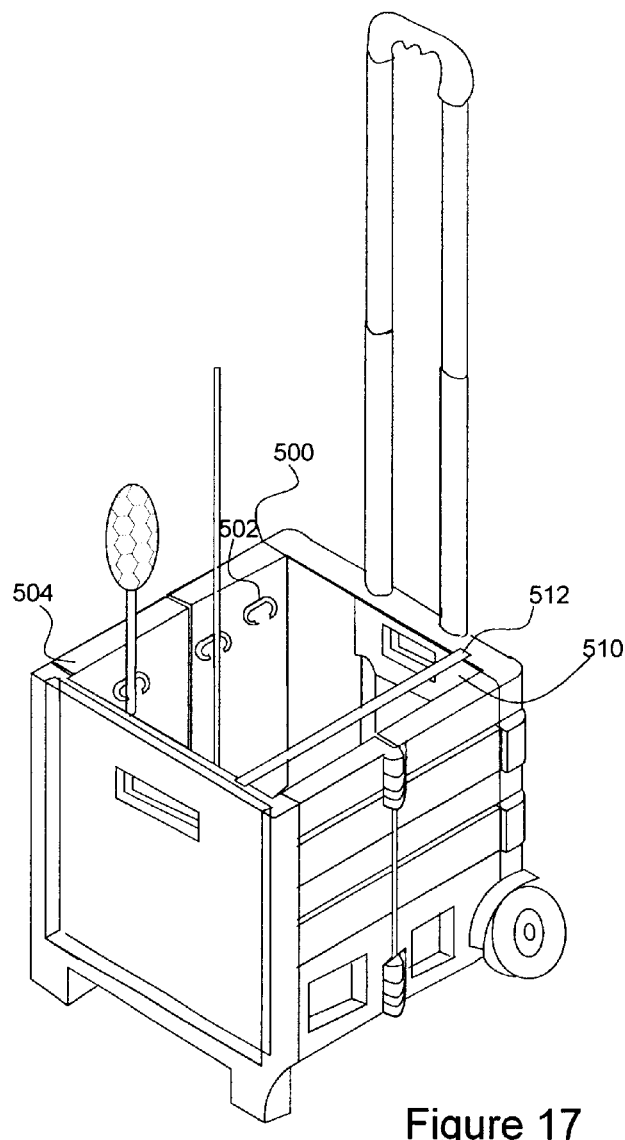
Figure 17
Figure 18
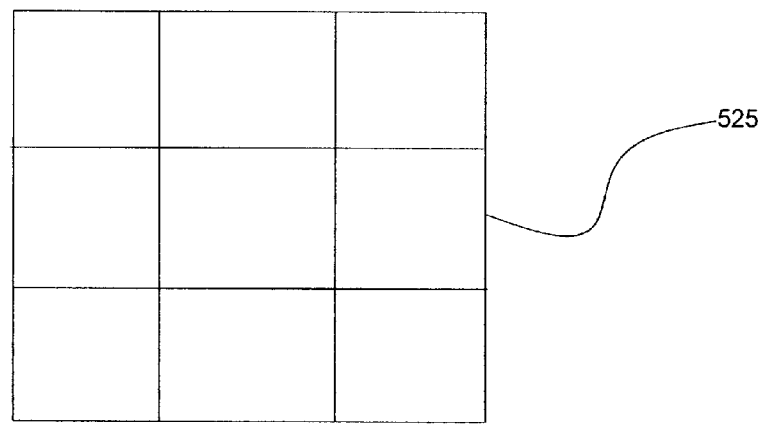

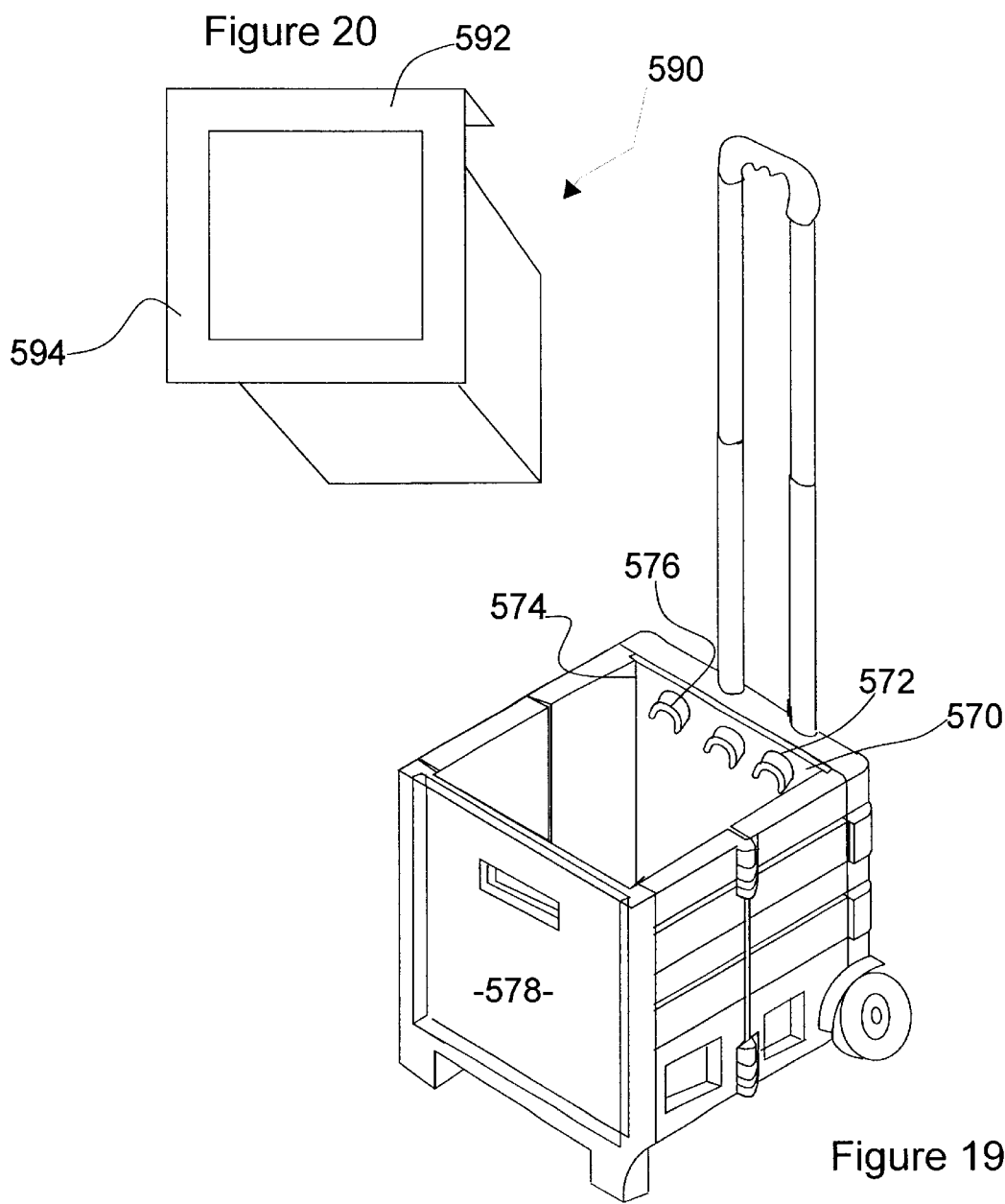

ACCESSORIES FOR A COLLAPSIBLE ROLLING CADDY

This is a continuation-in-part of copending application Ser. No. 60/121,376 filed on Feb. 25, 1999.

BACKGROUND OF THE INVENTION

1. Field of the Invention

The disclosed invention relates to an improved wheeled caddy that enables a user to customize the caddy based on an end use.

2. Brief Description of the Prior Art

SUMMARY OF THE INVENTION

A collapsible wheeled caddy has been disclosed in the prior art to carry groceries and other items. The wheeled caddy has a front and back panel, vertically hinged side panels, a hinged bottom panel and retractable handles within the back panel. The disclosed improvements enable the caddy to be used for more specialized purposes. The disclosed caddy has a lid that is hingeably attached to the edge of the front panel. The 270° rotation enables the lid to lie proximate the front panel when in an open position and adjacent the edge of the caddy when closed. Depending upon the dimensioning of the hinge, the lid can be recessed. In some embodiments, the lid rests on two or more of the edges, while in other embodiments the lid rests only on a single edge. The front panel of the caddy can be recessed to receive the lid, placing the lid on the same plane as said front panel. Alternatively, the hinge can be dimensioned to space the lid from the recess, bringing it in contact with the front panel. Preferably, the lid has arcs, dimensioned to accommodate the handles when said lid is closed, in the lid edge opposing the hinge. The lid can contain at least one storage member.

The recess can accommodate one or more storage members that have been dimensioned to be affixed with the recess. Alternatively, a storage panel, containing at least one storage member, can be configured to fit within the recess. A pair of hangers is configured to interact with the hingeable sides of the caddy. The hangers have a back support configured to lie adjacent the hinged side panels. A top plate is at right angles to the back support and a back panel is at a right angle to the top plate. The dimensioning between the back panel and back support from a snap fit over the hinged side panel edge. The hangers can have L-shaped brackets that extend at a right from the back panel. The leg of the L opposing the back panel serves to retain items, such as hanging file jackets, within the bracket. The back panel can, alternatively, continue to the bottom panel. Clips, or other retaining members, can be placed on the back panel to removably affix items to the back panel. An equipment receiving area can be placed in the caddy that has been configured to receive equipment, such as a stapler, and is designed to enable the equipment to be stored and used while in the receiving area.

A support rod can be used to provide support to portions of said lid not lying adjacent an edge of the caddy. The opposing edges of the caddy can be notched to receive the support to fit within the recess. A pair of hangers is configured to interact with the hingeable sides of the caddy. The hangers have a back support configured to lie adjacent the hinged side panel. A top plate is at right angles to the back support and a back panel is at a right angle to the top plate. The dimensioning between the back panel and back support form a snap fit over the hinged side panel edge. The hangers can have L-shaped brackets that extend at a right angle from the back panel. The leg of the L opposing the back panel serves to retain items, such as hanging file jackets, within the bracket. The back panel can, alternatively, continue to the bottom panel. Clips, or other retaining members, can be placed on the back panel to removably affix items to the back panel. An equipment receiving area can be placed in the caddy that has configured to receive equipment, such as a stapler, and is designed to enable the equipment to be stored and used while in the receiving area.

A stacking caddy can also be incorporated with the wheeled caddy. The stacking caddy consists of a front panel, a back panel, vertically hinged side panels, hinged bottom panel, and a lid. The back panel has a handle recess that is dimensioned to receive the handles, as well as a handle retaining member to prevent inadvertent removal of the handles from the recess. The lid is hingeably affixed to the front panel edge, lying proximate the front panel when open and adjacent at least one caddy edge when closed. Preferably caddy receiving channels are placed in the bottom of the stacking caddy that are dimensioned to receive the edges of the wheeled caddy, preventing lateral movement between the stacking caddy and wheeled caddys.

A spacer unit can be used to stack two wheeled, or a wheeled and stacking, caddys. The spacer unit has a top receiving area with wheel wells, alignment prongs, and locking members. The bottom receiving area has a caddy receiving channel dimensioned to receive the top edges of the lower caddy, a handle receiving area and locking members. The bottom receiving area of the spacer unit is placed on a first, bottom, caddy and locked to the bottom caddy. A second, wheeled caddy, is then placed in the top receiving area, and locked to the spacer unit. The spacer unit wheel wells and alignment prongs interact with the top caddy to prevent lateral movement.

A cover can be provided for one or more of the caddys to protect the contents. The covers has a body with a perimeter slightly greater than said caddy, a first height equal to the height of one caddy and a lid that is removable from at least a portion of the body. Preferably the lid is slit to form an open handle receiving area. The cover is open at the end opposite the lid. The cover can have a second height that is approximately equal to at least one caddy and is in the form of flaps. Attachment members are placed on the cover to individually secure each of the flaps to the cover body. Alternatively, the second height, equal to at least one caddy and having a periphery equal to the cover, is provided. The second height has open ends, at least one which has securing means that interact with securing means on the open end of the cover.

A container case can also be affixed to the front or back panels of the caddy. The case has a hinged lid and contains multiple self-leveling containers affixed to a rotatable brace. The rotatable brace folds to bring the containers within the case when the lid is closed and extends the containers in an accessible manner when the lid is open.

BRIEF DESCRIPTION OF THE DRAWINGS

The advantages of the instant disclosure will become more apparent when read with the specification and the drawings, wherein

FIG. 17 is a perspective view of the wheeled caddy containing side hooks;

FIG. 18 is a side view of a divider to place into a caddy;

FIG. 19 is a perspective view of a slide in divider containing side hooks;

FIG. 20 is a perspective view of a snap in corner divider;

FIG. 20 is a perspective view of a snap in corner divider;

DETAILED DESCRIPTION OF THE INVENTION

The collapsible plastic caddy has been known in the art, however, until the disclosed improvements, the caddy has only been useful for carry groceries or miscellaneous articles. The disclosed improvements enable the caddy to be used for numerous recreational activities, sports or tools, as well as office or business related applications.

Figure 1:
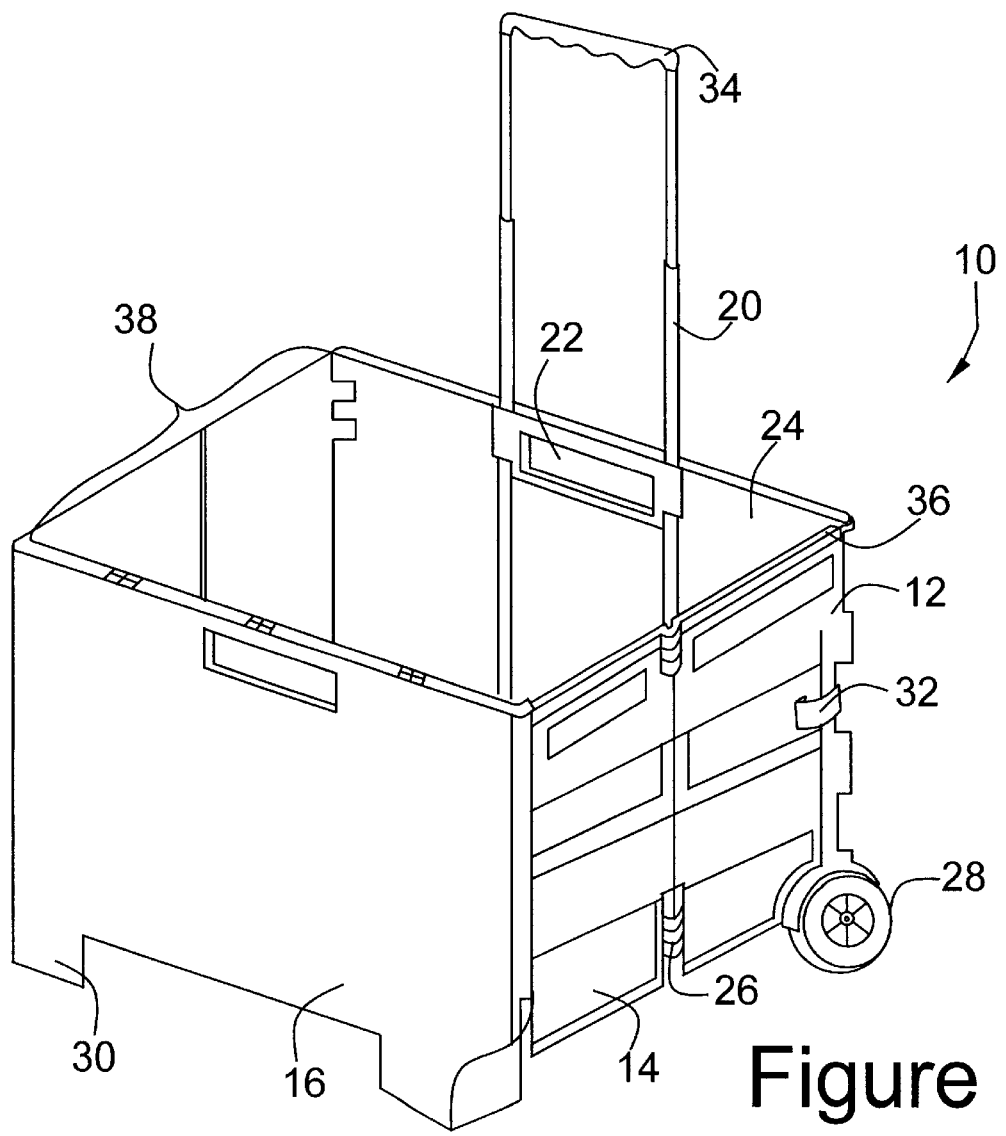
FIG. 1 is a perspective view of a prior art collapsible caddy.
Figure 28:
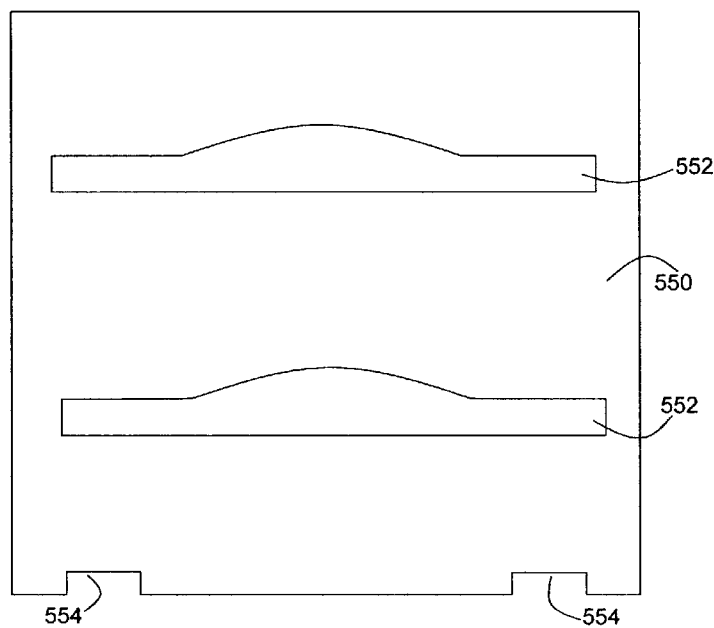
FIG. 28 is a top view of the bottom of a caddy having storage areas for side brackets.

In order to more clearly describe the improvements a brief description of the basic collapsible caddy will be included. In FIG. 1 the caddy 10 is illustrated in the open position. The side of the caddy 10 consist of a forward panel 14 and a rearward panel 12 that are connected through use of a hinge 26 and referred to collectively as side panels 30. Side locks 36 are placed over the top edge of the side panels 38 to prevent movement. The hinge 26, as referred to herein, can include multiple smaller hinges along the side or one single hinge. The opposing sides are identical and therefore only one side will be described in detail for brevity. The rearward panel 12 is hingeably connected to the back panel 24 to enable the rearward panel 12 to lie flush with the back panel 24 when the caddy 10 is collapsed. The forward panel 14 is also hingeably attached to the front panel 16 to enable those two pieces to lie flush with one another. The bottom panel (an embodiment of which is illustrated in FIG. 28) prevents the caddy from collapsing when in the position. To close the caddy 10 the bottom panel is placed adjacent the back panel 24 and the forward panel 14 and rearward panel 12 are folded inward at the hinges 26 to lie adjacent one another. This causes the caddy 10 to fold into a compact unit that is easy to store. The caddy 10 is maintained in the collapsed position through use of closure clip 32 that interacts with the front panel 16. The telescoping handles 20 can be placed in the extended position for wheeling the caddy 10 around or can be collapsed to place the handle 34 adjacent the top edge of the back panel 24. A pair of handle cutouts 22 is provided in the front panel 16 and back panel 24 for carrying the caddy 10. Wheels 208 are provided at the back of the caddy 10 with the distance the wheels lift the caddy 10 off the floor being compensated for by the legs 31.

Figure 2:
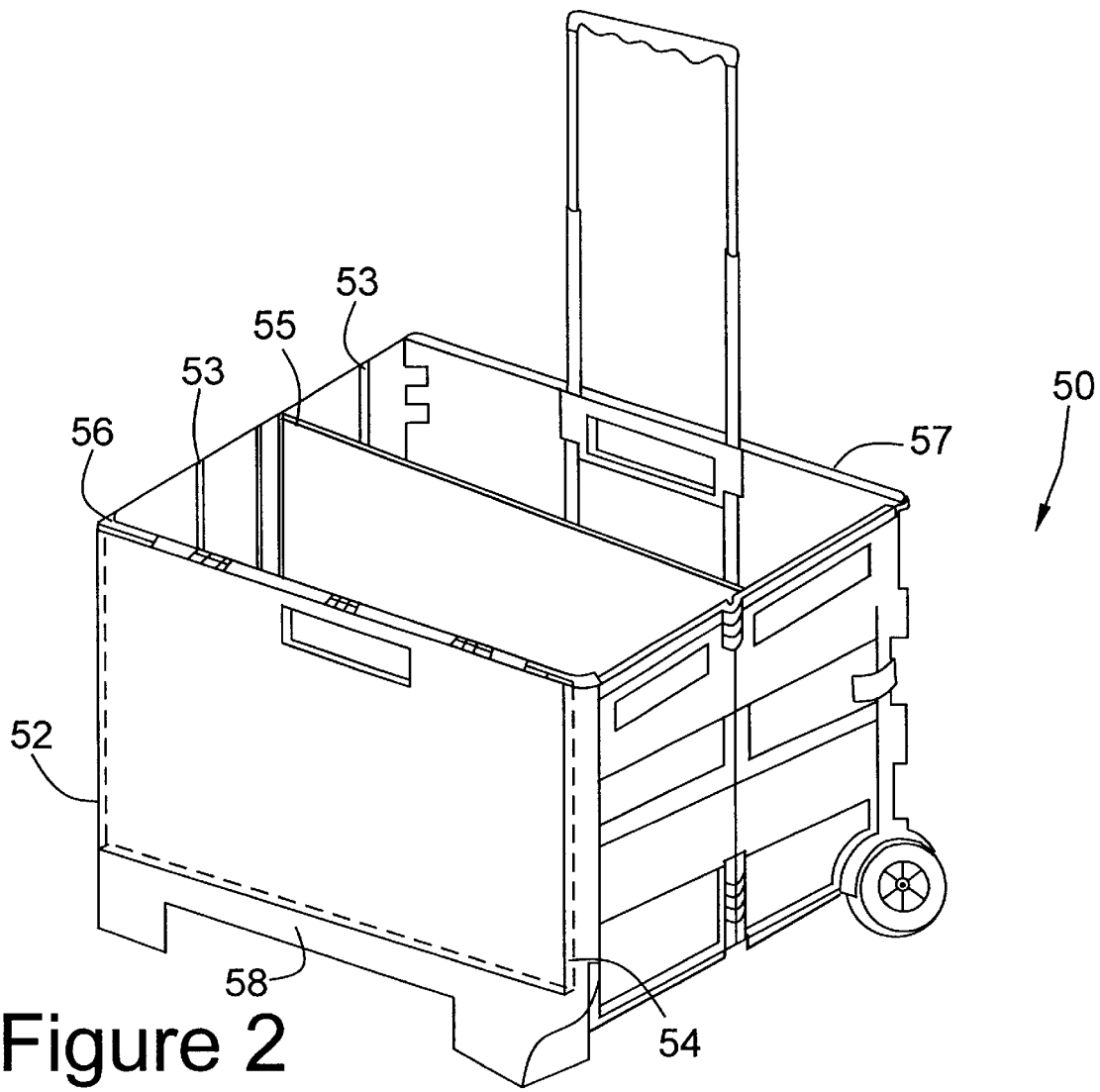
FIG. 2 is a perspective view of the disclosed wheeled caddy containing slide in dividers and a lid.

As seen from the description, the prior art caddy 10 is usable for carrying miscellaneous loose items but does not provide any protection or structure for any of the items being carried. The caddy 50, as illustrated in FIG. 2, has incorporated a top panel, or lid, 52 that can be placed over the open top of the caddy 50. The lid 52 can be secured to the back panel 57 through use of snap locks, Velcro®, or other methods. In this embodiment, the lid 52 rests within recess 54, although the recess 54 can be eliminated if desired. The lid 52 is connected to the front panel 58 thought use of hinges 56 which rotate about 270 degrees to allow the lid to rest on the edges of the open caddy when closed and flush with the front panel when open. The hinge 56 can be multiple, smaller hinges or one long hinge extending across the entire width of the caddy 50. This is dependent upon the weight to the lid, type of hinge, end use, manufacturing costs, etc., and can be decided at time of manufacture. Additionally, in the event support braces, or other accessories, described hereinafter, are to be incorporated for the end use of a particular caddy design, the hinge may require raising from the top edge of the caddy. This can be accomplished by raising the front edge an amount equivalent to the thickness of the add on accessories. FIG. 2 also illustrates the divider channels 53 and divider 55. The divider channels 53 enable a single divider to be moved or multiple dividers to be incorporated within this or any of the caddys disclosed herein.

Figure 3:
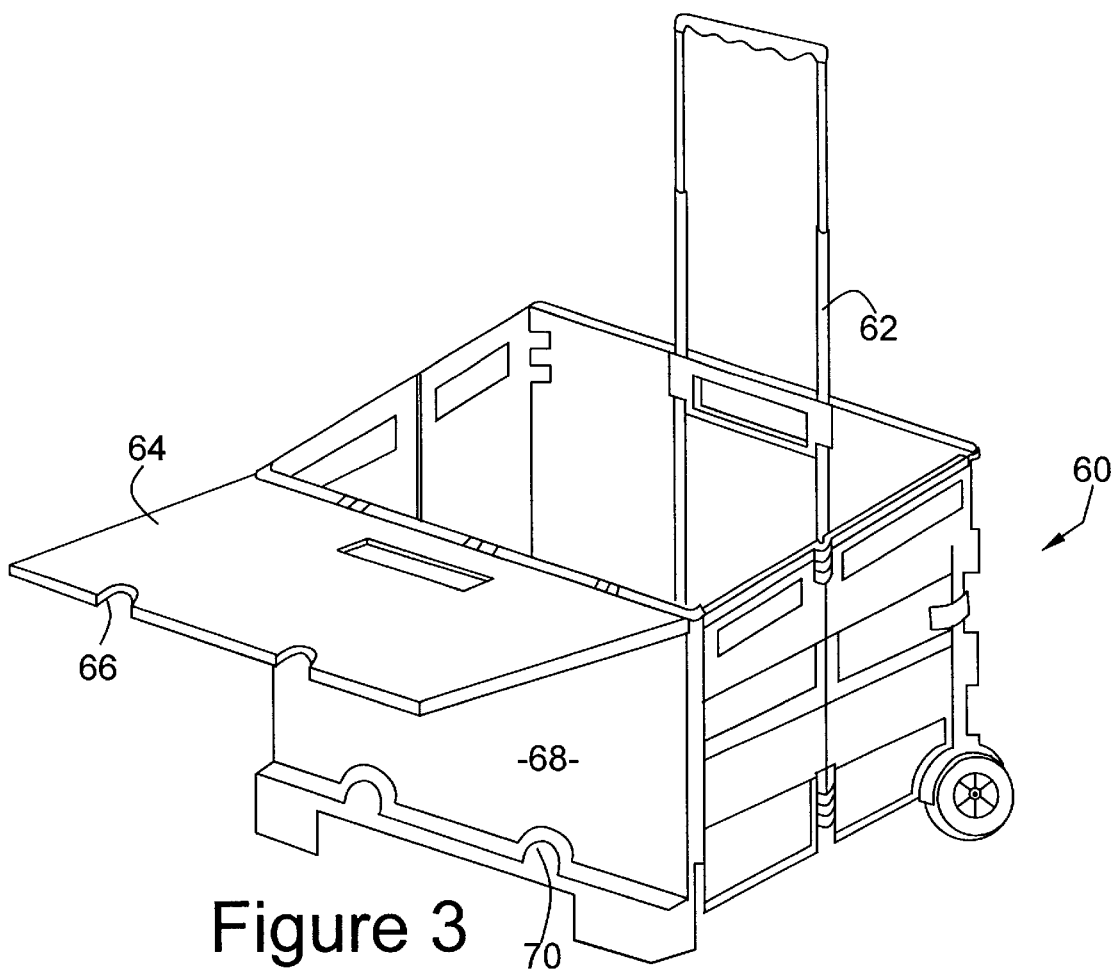
FIG. 3 is a perspective view of the wheeled caddy having an extended lid and lid receiving recess.

In the embodiment in FIG. 3 the lid 64 is provided with cutouts 66 that are dimensioned to fit around the handle base 62. The recessed lid receiving area 68 is similarly provided with arcs 70 that are dimensioned to receive the cutouts 66. In this way, when the lid 64 is open, lying adjacent the receiving area 68, the front surface is flush.

Figure 4:
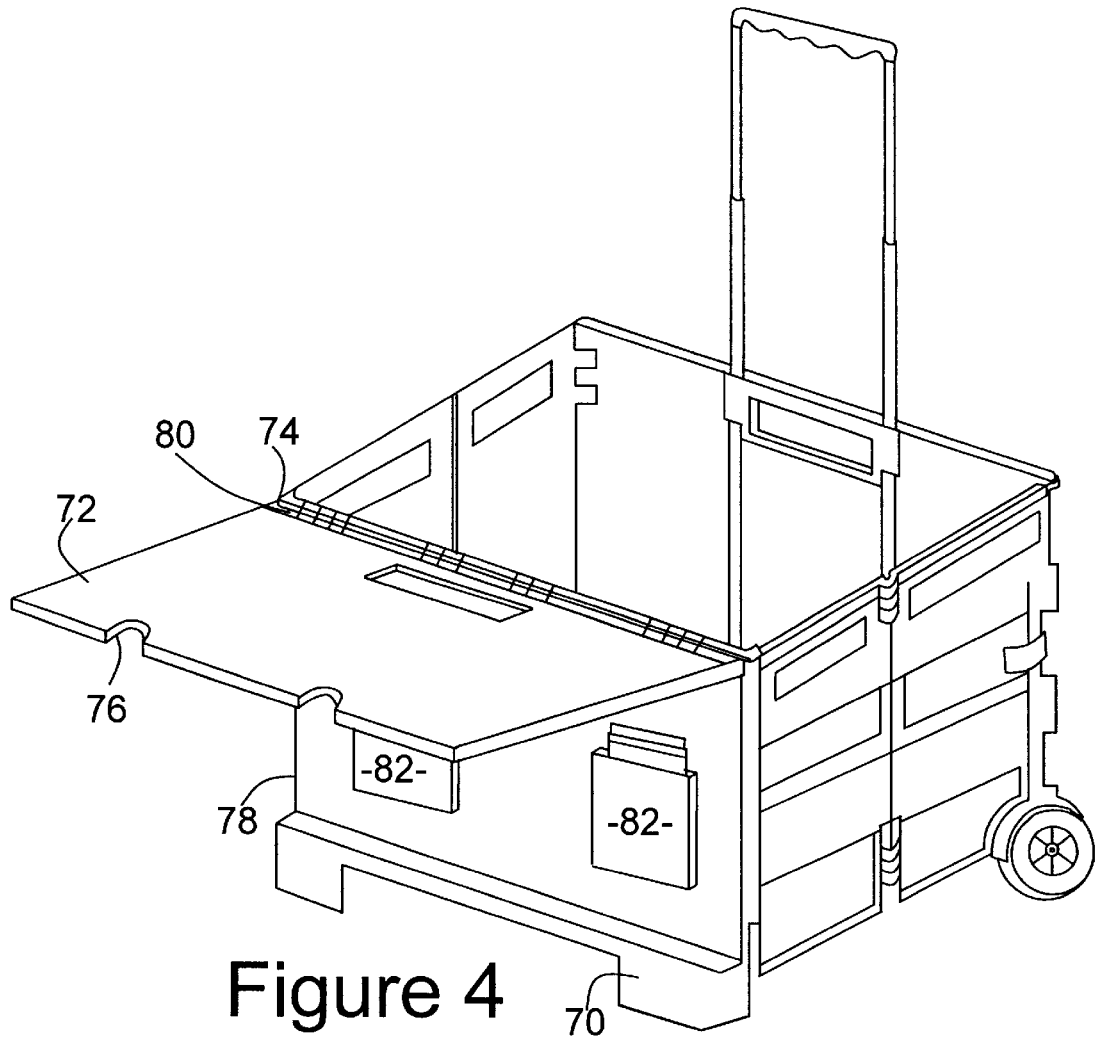
FIG. 4 is a perspective view of the wheeled caddy having an extended lid and containing pockets within the recessed area.

Alternatively, the lid 72 as illustrated in FIG. 4 can be spaced from the recess area 78 through use of a spacer 74. The lid 72 in this embodiment is lengthened to enable the edge of the lid 72 to contact the front panel 70. The spacer 74 moves the hinge 73 away from the front panel 70 a distance sufficient to enable the lid 72 to rest on the front panel 70. By spacing the lid 72 from the recessed area 78, pockets 82 can be placed within the recessed area 78. The pockets 82 can be used to hold flyers, sales materials, etc.

Figure 5:
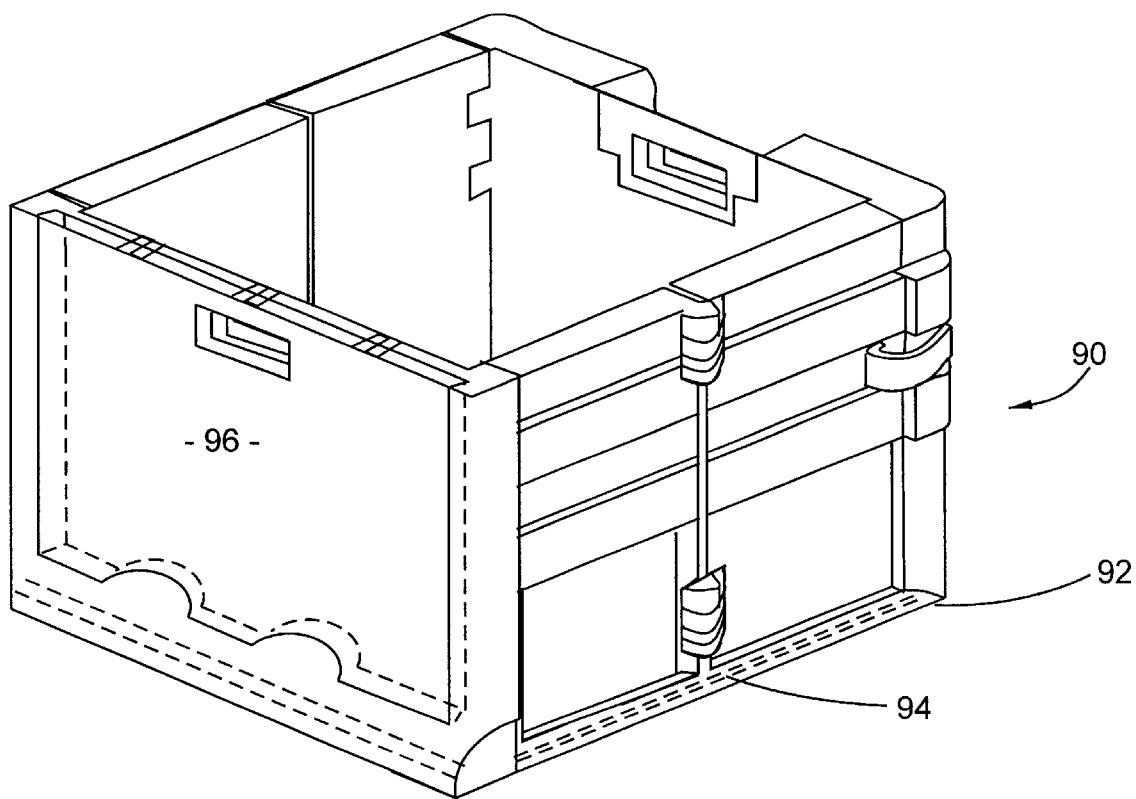
FIG. 5 is a perspective view of the stackable caddy.
Figure 6:
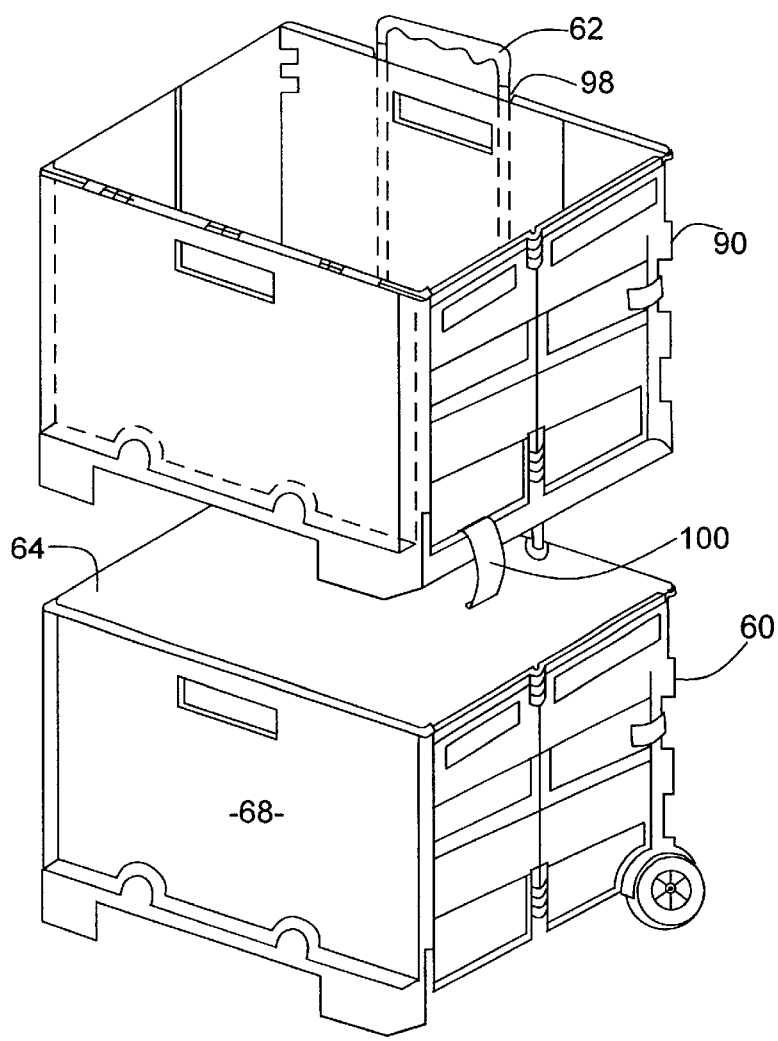
FIG. 6 is a perspective view of the stackable caddy being placed on a wheeled caddy.
Figure 7:
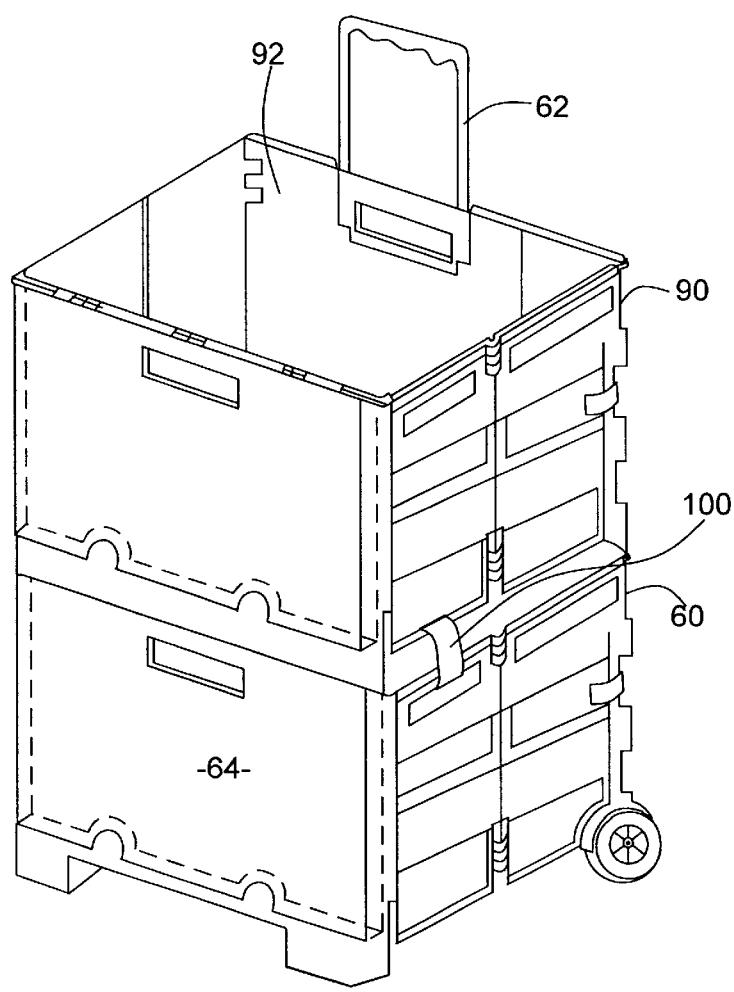
FIG. 7 is a perspective view of the stackable caddy placed into position on the wheeled caddy.

In FIGS. 5–7 a top caddy 90 is illustrated that has been designed to interact with the foregoing wheeled caddys. Although in these figures reference is made to wheeled caddy 60, the top caddy 90 can be used with any of the wheeled caddys disclosed herein. The top caddy 90 has a flat base 93 and, in this embodiment, a recessed channel 94 that interacts with the top of the wheeled caddy 60 to help prevent slipping. The recessed channel 94 is an optional feature and the top caddy can be secured to the bottom wheeled caddy by other means. The top caddy 90 is provided with a cutout 98 that compensates for the handles 62 being recessed enables the top caddy 90 to match edges with the bottom wheeled caddy. The top caddy 90 and the bottom caddy 60 can also be maintained in position through use of snap clips 100. The clips 100 can be either loose clips that fit into notches placed into the forward or rearward side panels or, alternatively, the clips can be integral to one of the caddys and snapped onto the other caddy. If the clip is integral with one of the caddys, it is preferable the top caddy since the clip would only be used in conjunction with the top caddy. In FIG. 6 the lid 64 is closed prior to placing the top caddy 90 onto the wheeled caddy 60 and locking the two units together through use of the clips 100.

Figure 26:
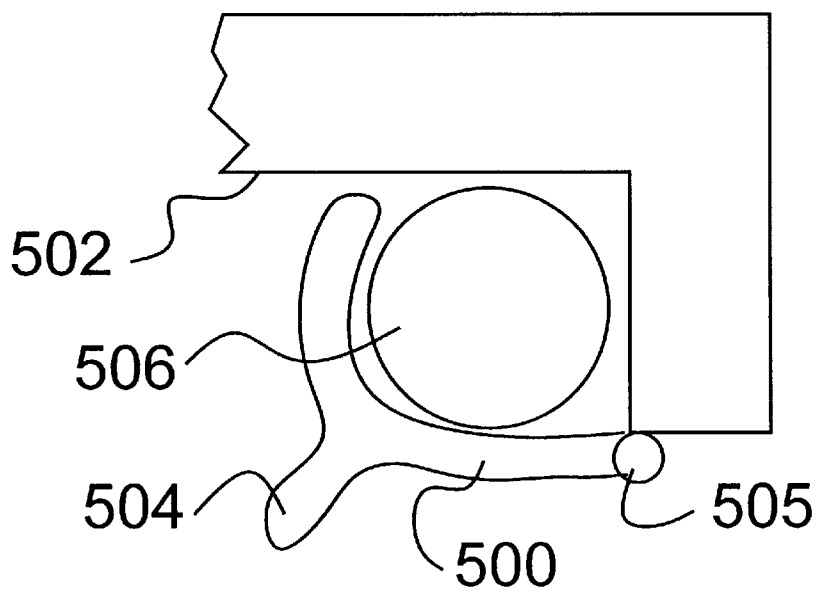
FIG. 26 is a top view of a clip system to secure a top caddy to the wheeled caddy handles.

Once method of maintaining the top caddy in place and adjacent the handles 506 is illustrated in FIG. 26 wherein hinged clip 500 is connected to the cart 502 through hinge 505 and locks the top caddy to the handles 506. In this embodiment, the clip 500 is provided with a handle 504 to facilitate opening and the locking mechanism is internal at the connection between the caddy and the clip 500. Other clip designs will be apparent to those skilled in the art.

In FIG. 7 the bottom panel 92 of the top caddy 90 is left adjacent the back panel while the lid 64 is left open on the bottom wheeled caddy 60. This placement of the lid 64 and bottom panel 92 provides a double depth to the unit, enabling the storage of larger, bulkier items. In this figure, the top caddy 90 and bottom wheeled caddy 60 are locked together through use of the snap clip 100. As can be seen from this figure, the handles 62 extend a sufficient distance beyond the top caddy 90 to enable the user to easily maneuver the combined units. More than one top caddy 90 can be placed on the wheeled caddy 60, with each top caddy 90 being attached to the lower caddy through use of snap clips 100. The handles 62 would be extended to a length sufficient to clear the top stacking caddy 90 to enable the user's hand to comfortably grip the handle 62.

Figure 8:
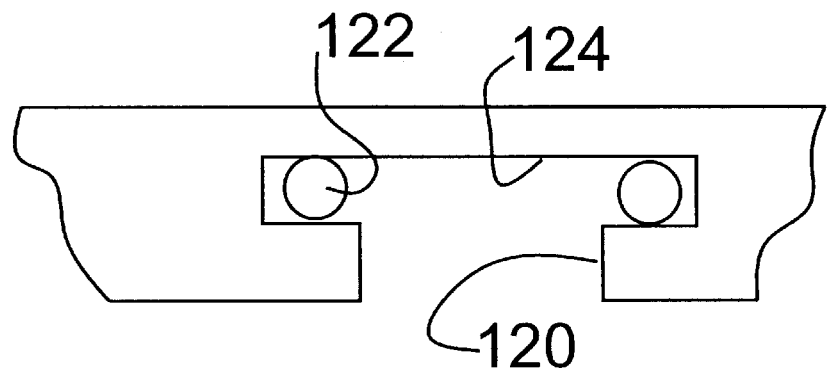
FIG. 8 is a top view of an alternate retaining method for the stackable caddy.

In FIG. 8, there is an alternate design for receiving the handles within the caddy. Rather that the cutout 98 of FIG. 6, the receiving area is provided with flanges 120 that are parallel, and spaced from, the back wall 124. Alternatively, the flanges can be replaced with a secondary wall to form a channel to receive the handles. It should be noted that the stationary wall, either partial or complete, will only be applicable for use with handles that do not have the plastic coated grip used with handles 62. The grip, commonly used in the art, extends the diameter of the handle grip beyond that of the vertical, telescoping bars. Therefore, when the flanges 120 are spaced a sufficient distance from the back wall 124 to receive the handle grip, the back wall 124 to flange 120 distance is too great to prevent movement of the caddy 90. To prevent lateral movement of the caddy 90, the distance between the back wall 124 and the flanges 120 much be only slightly greater than the diameter of the handles.

Figure 29:
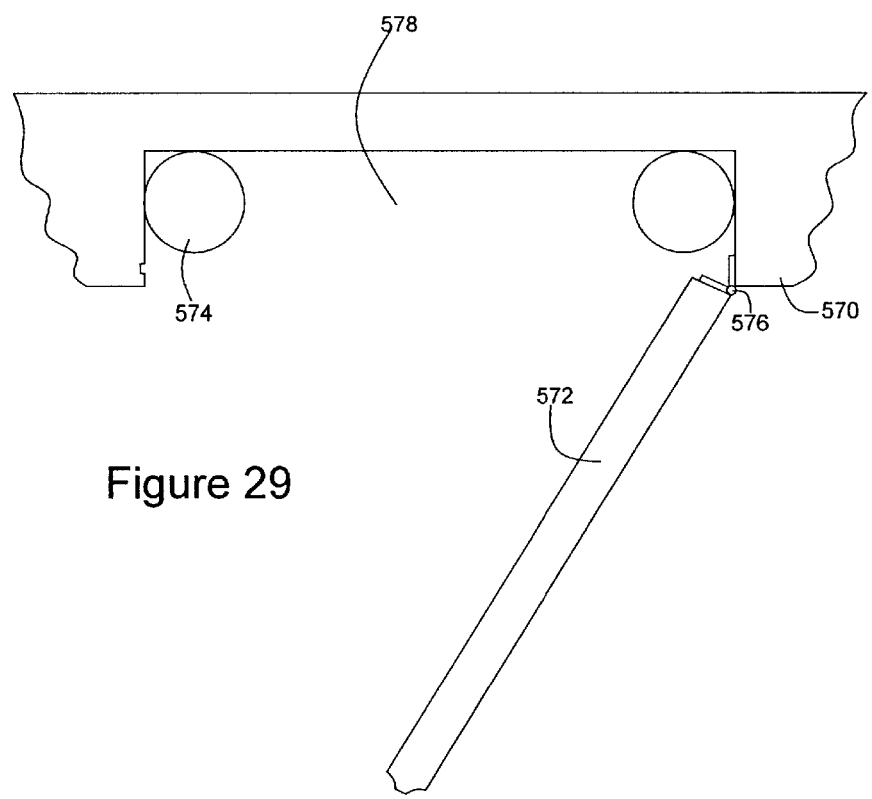
FIG. 29 is a top view of a locking design for use with a stacking caddy.
Figure 30:
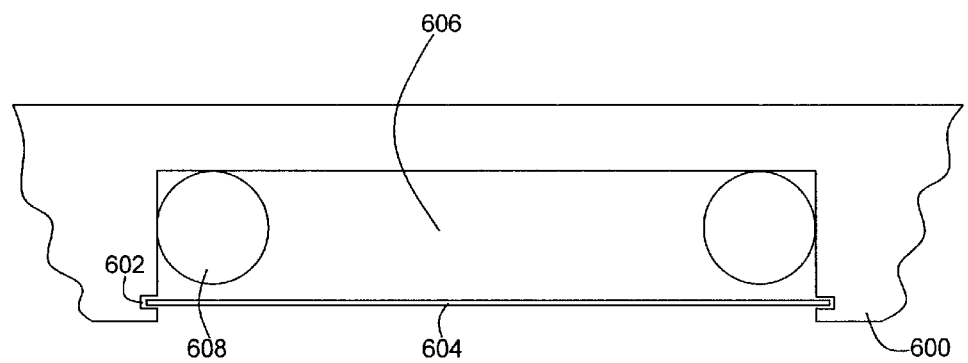
FIG. 30 is a top view of a slide panel design for use with a stacking caddy.

In order to accommodate handles having grips, the caddy 570 of FIG. 29, has a molded receiving space 578 dimensioned to receive the handles 574. A door 572, hinged to the caddy 570 at hinge 576, opens to receive the handles 574 and then snap locks into the dosed position. The method of maintaining the door dosed can vary and will be known in the art. In FIG. 30 the receiving area 606 is further provided with notches 602 extending at least most of the height of the caddy 600. A panel 604 is dimensioned to slide into the notches 602 once the handles 608 are within the receiving area 606.

Figure 9:
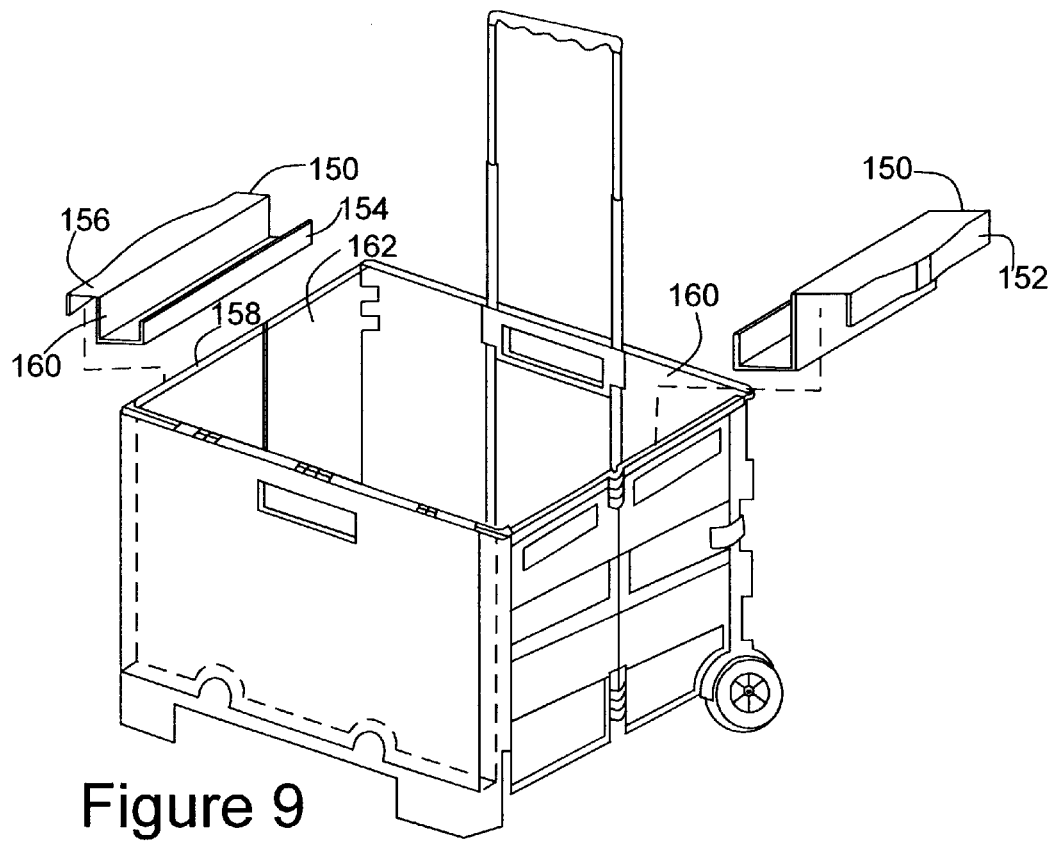
FIG. 9 is an exploded perspective view of the hanging folder rails to be snapped onto the wheeled caddy side rails.
Figure 10:
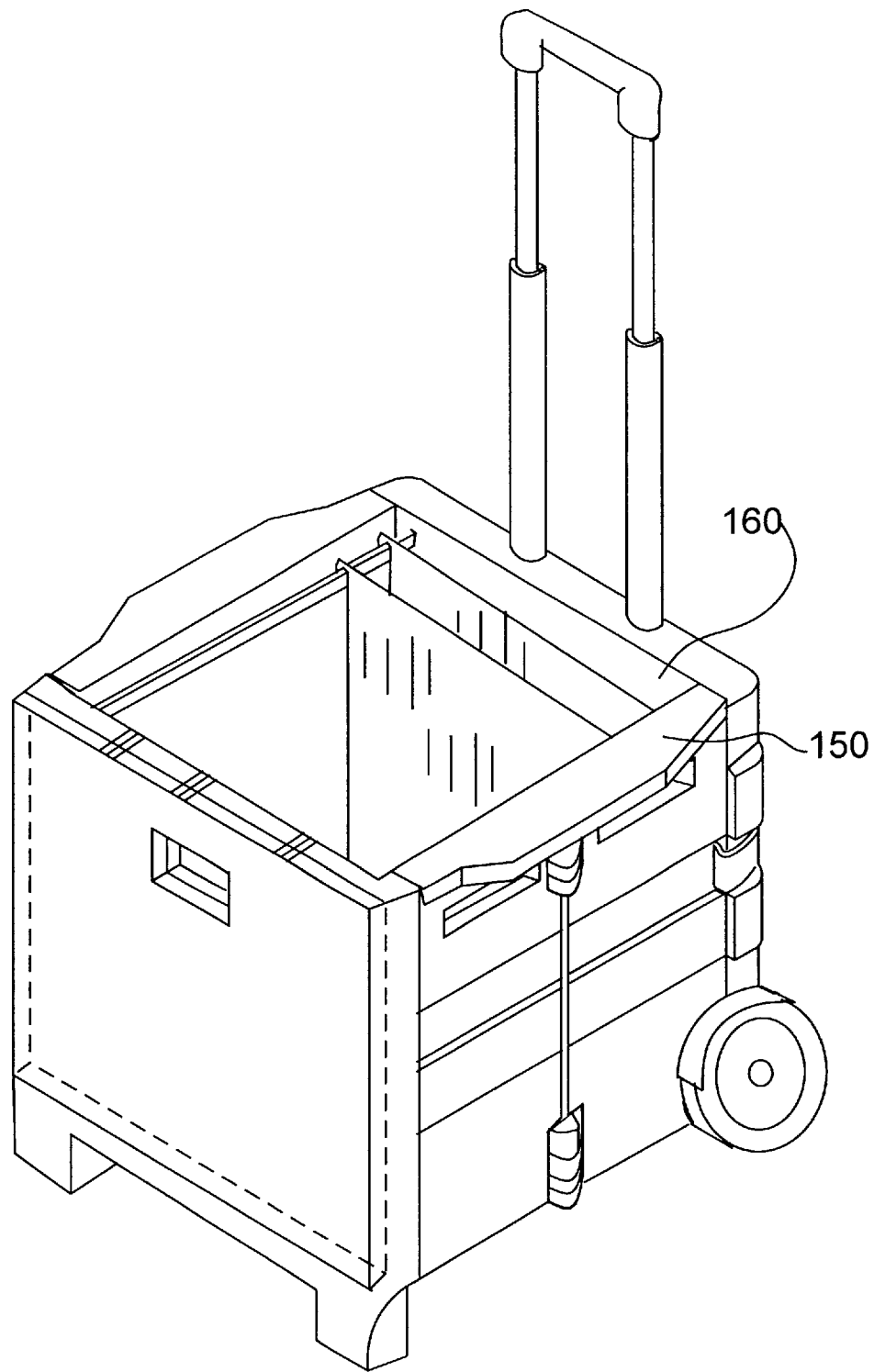
FIG. 10 is a perspective view of the wheeled caddy containing hanging folder rails with hanging file folders placed on the rails.

In FIG. 9 a pair of hangers 150 are placed over the side panels 162 to support items, such as hanging file folders. The back support 152 must be configured to accommodate the hinges 26 to enable the top plate 156 to lie adjacent the caddy edge 158. The brackets 154 are dimensioned to receive the hooks the hanging file folders or other hanging items, although other bracket configurations can be used to support specialized items. As illustrated in FIG. 10, the back panel 160 must have adequate length to drop the brackets 154 a distance from the caddy edge 158 sufficient to enable the top 64 to close without being blocked by the hanging folders. In one embodiment, illustrated in FIG. 28, the bottom panel 550 is molded with hanger receiving area 552. In the illustrated embodiment the receiving areas 552 are configured to receive the hangers 150, when not in use, however it will be obvious to alter the design of the recesses in accordance with the articles being stored. The bottom panel 550, in this and other embodiments, is hinged to the cart through use of hinges 554, as known in the art.

To provide further versatility, the caddy 200 has a back panel 202 that is provided with recessed pockets 204.

Figure 11:
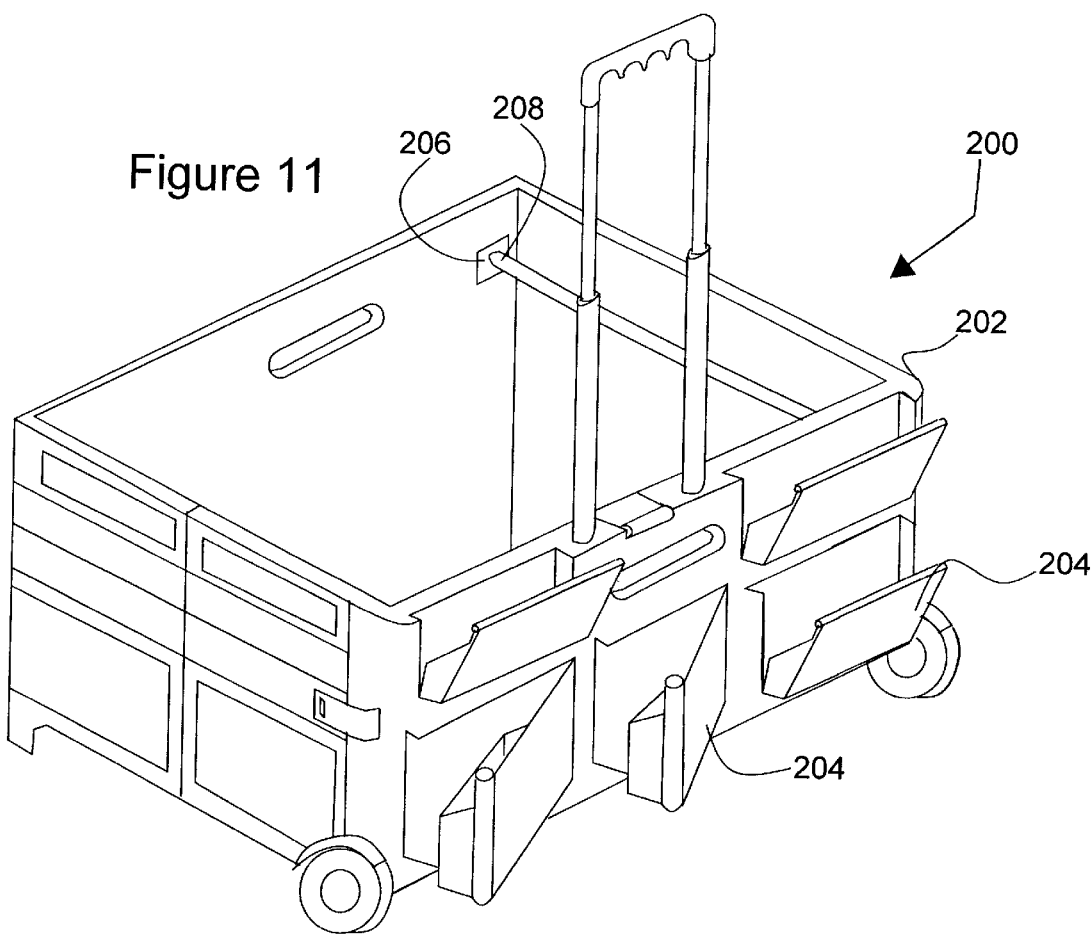
FIG. 11 is a perspective rear view of the wheeled caddy containing pockets and holders.

Pockets as used herein can be any type of sleeve, flip out cover, or any other means for holding any type of supplies or materials. The design illustrated in FIG. 11 is for example only and the configuration can take any design applicable to the end use. An alternate method of holding the hanging folders is also illustrated in this figure. Receiving rod brackets 206 are placed proximate each corner, spaced a sufficient distance from the sides to provide clearance for the hanging folders. File rods 208 are subsequently inserted into the rod brackets 206 and the folders placed onto the rods 208. The rod brackets can be added after manufacture or molded into the caddy. Alternatively, a hole can be drilled into the side of the caddy to receive the file rod.

Figure 12:
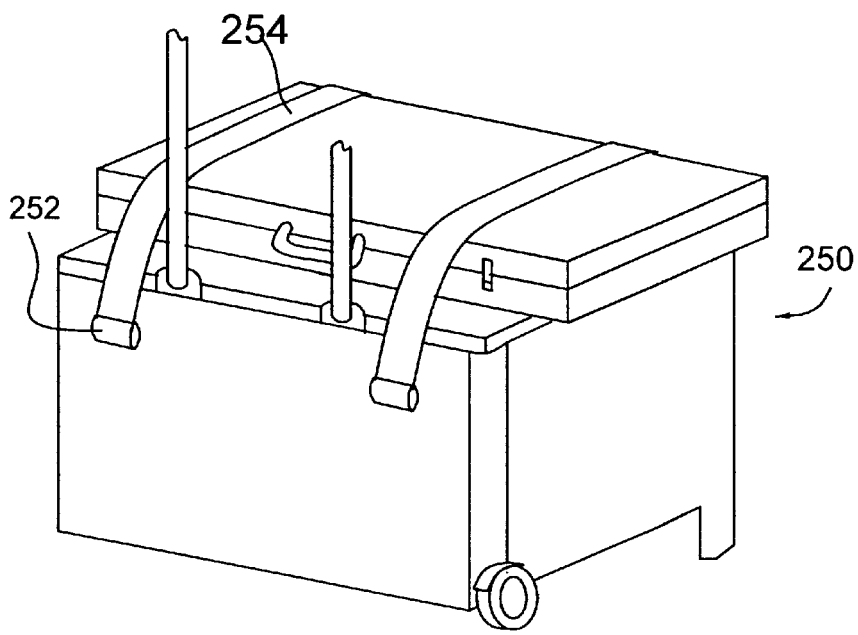
FIG. 12 is a perspective view of the wheeled caddy having straps to secure additional items.

One of the areas of greatest use for the disclosed caddy is in the legal field where attorney must appear in court or depositions with large quantities of documents. The disclosed caddy provides the ability to transport files and, as illustrated in FIG. 12 luggage or a briefcase. In the caddy 250, retractable straps 254 are used to maintain the additional item in position on top of the caddy 250. The straps 254 remain in the housings 252 until needed and preferably maintained under tension even when extended. The methods for the extension and tension are known in the seat belt art and any modifications will be evident to those skilled in the art. The front of the caddy 250 is provided with receiving clips to interact the with strap 254 clips. The clips can be of any design convenient and are well known in the art. As an alternative to the straps being maintained under tension, adjustable straps can be used that are tightened the required amount to keep the items in position. Elasticized straps, such as budgie cords, can also be used.

Figure 13:
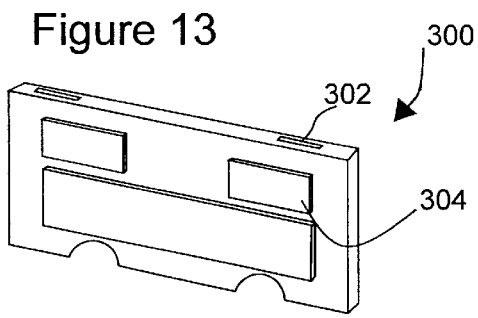
FIG. 13 is a perspective view of a snap-in panel for use within the recess area.

To increase versatility of the wheeled caddy, snap-in panels, as illustrated in FIG. 13 as panel 300, can be used. The snap-in panel 300 is shown with three pockets 304, however any number of pockets in any configuration can be used. This is for example only and is not intended to limit the invention. In this illustration, a pair of receiving notches 302 is placed in the top of the panel 300. The notches 302 interact with tabs in the top of the recessed area of the front panel to enable the panel 300 to be snapped in and out. Other methods of removably securing the a panel into either the recessed area or onto the front panel of the caddy can be used and will be evident. One quick method of applying the panels is with magnets placed along the back of the panel. Magnetic strips, or individual magnets, can be placed in corresponding locations on the caddy to receive the panel. It should be noted that the removable panels, in any securing method, can be placed along the front, back or sides of the caddy.

Figure 14:
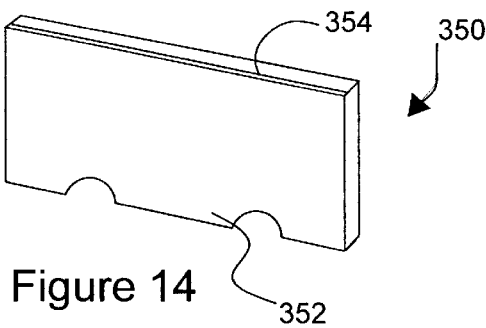
FIG. 14 is a perspective view of an alternate lid having a display receiving slot.

In FIG. 14, the lid 350 is shown with a clear front panel 352 spaced from the body of the lid 350. A receiving slot 354 is provided between the lid 350 and the front panel 352 to receive a sign, poster, or other information.

Figure 15:
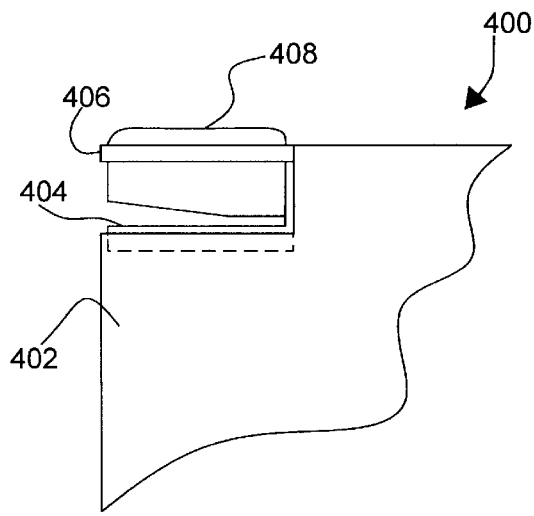
FIG. 15 is a side view of a corner of an alternate caddy having an equipment receiving area to retain items such as a stapler.
Figure 16:
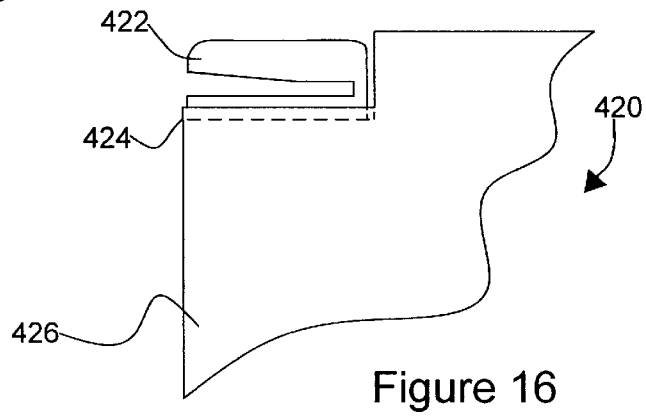
FIG. 16 is a side view of an additional embodiment having a recessed equipment receiving area.

The caddy will be used for transporting documents, trade shows, and other uses involving paperwork. In addition to the foregoing aids to organizing materials and supplies, FIG. 15 illustrates an alternate embodiment to the caddy 400 incorporating an equipment area to receive a stapler 408, paper punch etc. The stapler 408, or other equipment, can be built in or added on, depending up manufacture preference. One corner of the caddy body 402 is molded to provide a channel 404 to enable access to a stapler 408. The illustrated stapler 408 is placed into a receiving area that is formed within the body 402, at the of manufacture, to receive a stapler 408 of a predetermined size. Alternatively, the non-movable parts of a stapler can be molded directly into the body 402. It is critical that the open portion of the stapler that receives the papers is aligned with the channel 404 in order to prevent the papers from being changed. The top of the stapler must also extend far enough above the lip 406 to enable the stapler to be fully depressed to completely close the staple. In an alternate embodiment, illustrated in FIG. 16, the lip 406 has been eliminated and a recessed receiving area 424 molded into the body 426 to receive the stapler 422. To prevent the stapler 422 from falling out of the recessed area 424, Velcro®, two-sided tape or other material can be used to affix the stapler 422 to the bottom of the recessed area 424.

Another use for the wheeled caddy is for sports and camping. In FIG. 17, a panel 500 is provided with snap-in clips 502 to receive items such as fishing rods and nets. Preferably the clips 502 are paired, one located proximate the rim of the caddy, as seen, and the other proximate the bottom of the caddy (not shown). The illustrated panel 500 is affixed to the caddy through use of a L-shaped lip 504, such as used in conjunction with the hanging folders, described heretofore in FIG. 9. The L-shaped lip 504 has the same design as the top plate 156 of the hanger 150 with the back panel 160 replaced with the panel 500. Other means, such as Velcro®, can be used to secure the panels to the caddy and will be obvious to those skilled in the art. Additionally, other clip designs, loops or other holding members for attaching a variety of items to the panels can be use. The lid 506 is, at the time of manufacture, proportioned to provide clearance for the items being held by the panel 500. In some embodiments, the lid would either be cut away on both sides to enable an additional panel 500 to be placed on the opposing side of the caddy, enabling both panels to carry tall. The panels can also contain pockets, snaps, Velcro® or other storage and/or attachment members, either alone or in combination with the clips 502. The snap-in panel 300 of FIG. 13 can be modified to hold the appropriate items, such as lures and bait. The modification of the snap-in panels 300 and panels 500 also enable the same basic caddy to be used for various activities. Additionally, a cooler can be placed in the caddy to store items that need to remain cool.

When the lid is cut back to accommodate tall items, the strength of the lid is compromised and is not as safely used as a seat. Therefore, a removable support rod 512 should be incorporated to provide support to the lid 506 when closed. It is preferable that notches 510 are provided in the sides to receive the support rod 512, thereby keeping the lid flush with the back and hinge arrangement. For ease of illustration, the support rod 512 of FIG. 17 is positioned on the side opposite the cutaway portion of the lid 506. In actual use, the rod 512 would be placed at the cut edge to give the support usually provided by the caddy edge.

FIG. 18 illustrates an egg crate insert 525 that is dimensioned to fit within the wheeled caddys. In FIG. 20, the box insert 590 is provided with the L-shaped lip 592 to secure the box insert 590 to one side of a caddy. In some positions within the caddy, the support lip 594 would contact the front panel, and therefore the hinge, of the caddy. To avoid interfering with the hinge, the support lip 594 is a flat element rather than a L-shaped clip-on. The dimensioning of the lip 592 must be such that it does not interfere with the handles when placed on the back corners. Both the egg crate insert 525 and the box insert 590 can extend either the complete depth and/or width or only a portion of the depth and/or width of the caddy.

In FIG. 19 the panel 570 slides into channel 574 provided within caddy and described in more detail heretofore. The clips 572 are, as described heretofore, used to retain items adjacent the back panel, and can be combined with pockets as previously noted. In this embodiment, the clips 572 are provided with recess pockets 576 to maintain the clips 572 flush with the surface of the panel 570 when not in use. The clips 572 can be provided with springs that, when not being held in the downward position by items, return to the recess pocket 576. The lid 578 is cut to accommodate the items placed within the clips 572 and a support bar, as described heretofore, can be incorporated to provide added support. Although the fishing equipment is illustrated herein, it should be noted that the clips, pockets, etc. can be designed to hold tools, screws, electrical equipment, etc.

Figure 21:
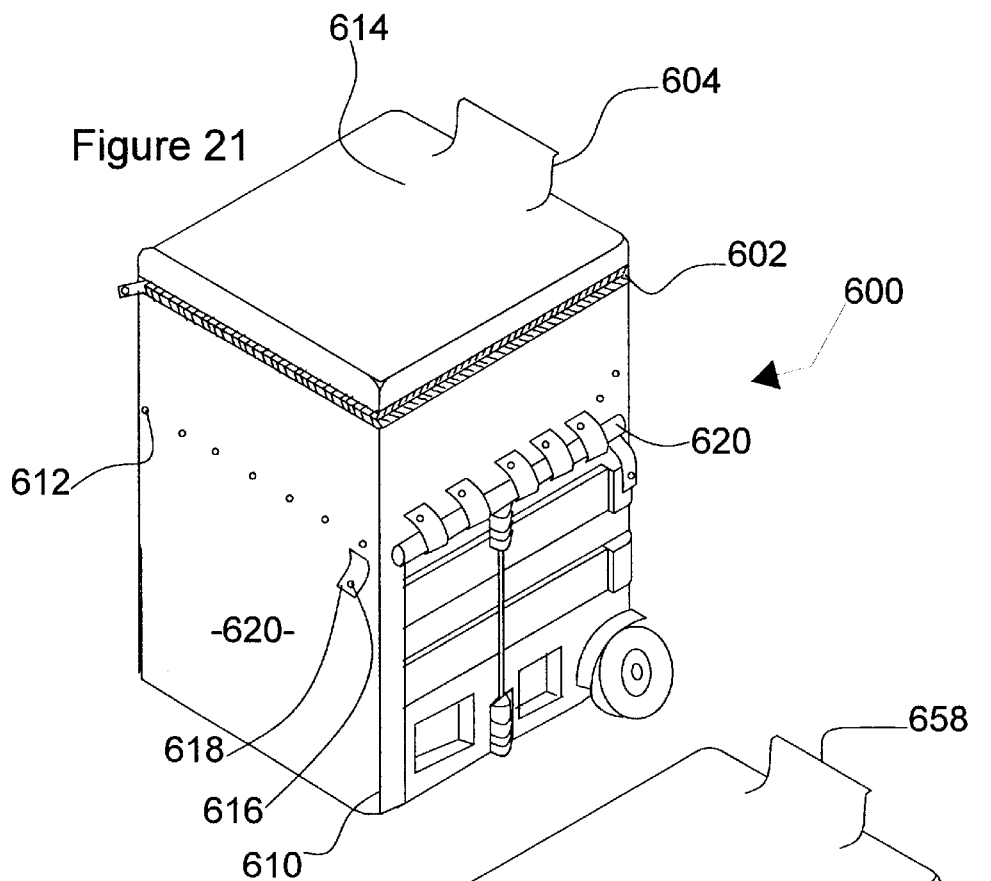
FIG. 21 is a perspective view of one embodiment of a cover to place over the caddy.

When the caddy is used for outdoor activities, the wheels can be enlarged to make rolling over rough ground easier and rubber wheels can be used to further enhance movement over rough ground. The wheeled caddy is advantageous for camping enabling a user to easily transport miscellaneous items from the car to the campsite. When used in outdoor situations, covers are placed over the caddy to protect the contents. In FIG. 21 the cover 600 is a single body 608 that, in this figure, covers two caddys, although the length can be adjusted to fit any number of stacked caddys. Corner slits 610 provide for height adjustment by enabling the flaps 620 to be rolled or folded to shorten the body 608 to the desired length. In this illustration, snaps 612 are placed around the body 608 at the level of a single caddy. When more than two caddys are stacked, the length of the body and number of securing members can be altered to accommodate the number of caddys. When three caddys are stacked, two rows of securing members would be provided and the corner slits the length of two caddys. The securing members illustrated are snaps 612 that interact with tabs 616 and corresponding snap 618. The flap 620 is rolled to just below the snaps 612 and the corresponding snap 618 on the tab 616 secured to the snap 612. Other methods of securing the flaps 620 will be evident and can include Velcro®, snap buckles, etc. The ability to open only one of the flaps 620 enables the user to access any snap in panels as described heretofore, without the necessity of removing the entire cover.

A zipper 602 can be incorporated to enable accessibility to the top of the upper most caddy through either flipping open or completely removing the lid 614. The zipper 602 can be replaced with snaps, Velcro®, or other closure members to correspond with the material of manufacture, end use, etc. The zipper can extend around all four (4) sides or only on three (3) sides of the cover 600. The portion of the cover that is adjacent the handles is slit in a U-shape to form flap 604, to enable the handles to be extended while the cover 600 is in place.

Figure 22:
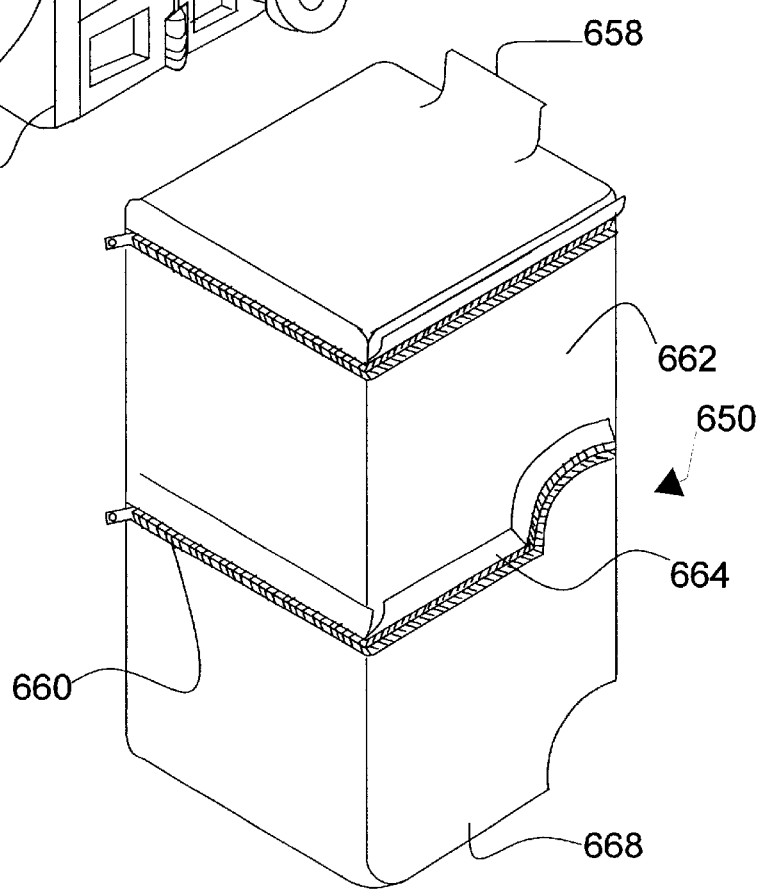
FIG. 22 is a perspective view of an alternate embodiment of a cover.

In an alternate cover 650, illustrated in FIG. 22, the body zipper 660 is used to separate the upper cover 654 and lower cover 668. The complete separation of single caddy sized covers enables the length of the cover 650 to be adjusted in accordance with the number of caddys stacked. In this embodiment, both the body zipper 660 and the lid zipper 662 are covered with protective flaps 664 to prevent dirt and moisture from entering the zipper. The upper cover 654 differs from the lower cover 668 with the addition of the flap 658 to enable the handles to be extended for use. The lower cover 668 can be manufactured with an additional zipper, Velcro®, etc., at the bottom to cover additional caddys when required.

It should be noted that the caddys can be of any size that is convenient for end use. A height of six (6) inches may be appropriate for transporting lab beakers while a height of two (2) feet would be appropriate for camping. Further, the handle height can be adjusted to enable any number of caddys to be stacked.

Figure 23:
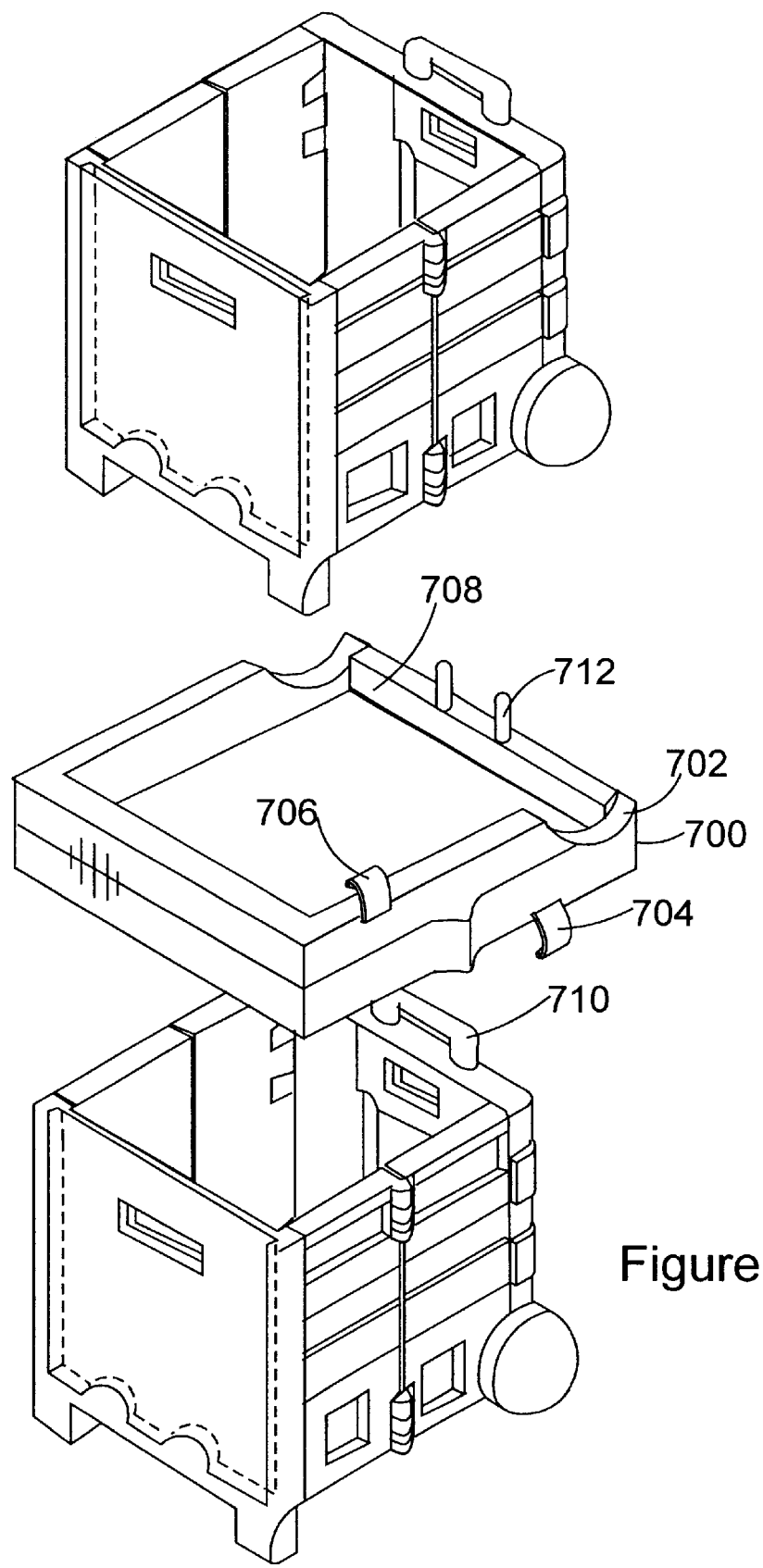
FIG. 23 is an exploded perspective view of two wheeled caddys and a spacer that enables the two wheeled units to be stacked.

In FIG. 23, a caddy separator 700 is illustrated to enable two wheeled caddys to be stacked. The separator 700 has wheel wells 702 that are dimensioned to receive the wheels of the top caddy. The separator 700 is locked onto the two caddys through use of snap clips 704 and 706. The snap clips 704 and 706 prevent lateral movement between the two caddys, as well as preventing separation. The handle storage area 708 must be dimensioned to receive the handle 710 of the bottom caddy. Once locked, the handle of the top caddy can be used to roll the combined unit. Aligning tabs 712 can also be provided to interlock with the top caddy and provide additional support.

Figure 24:
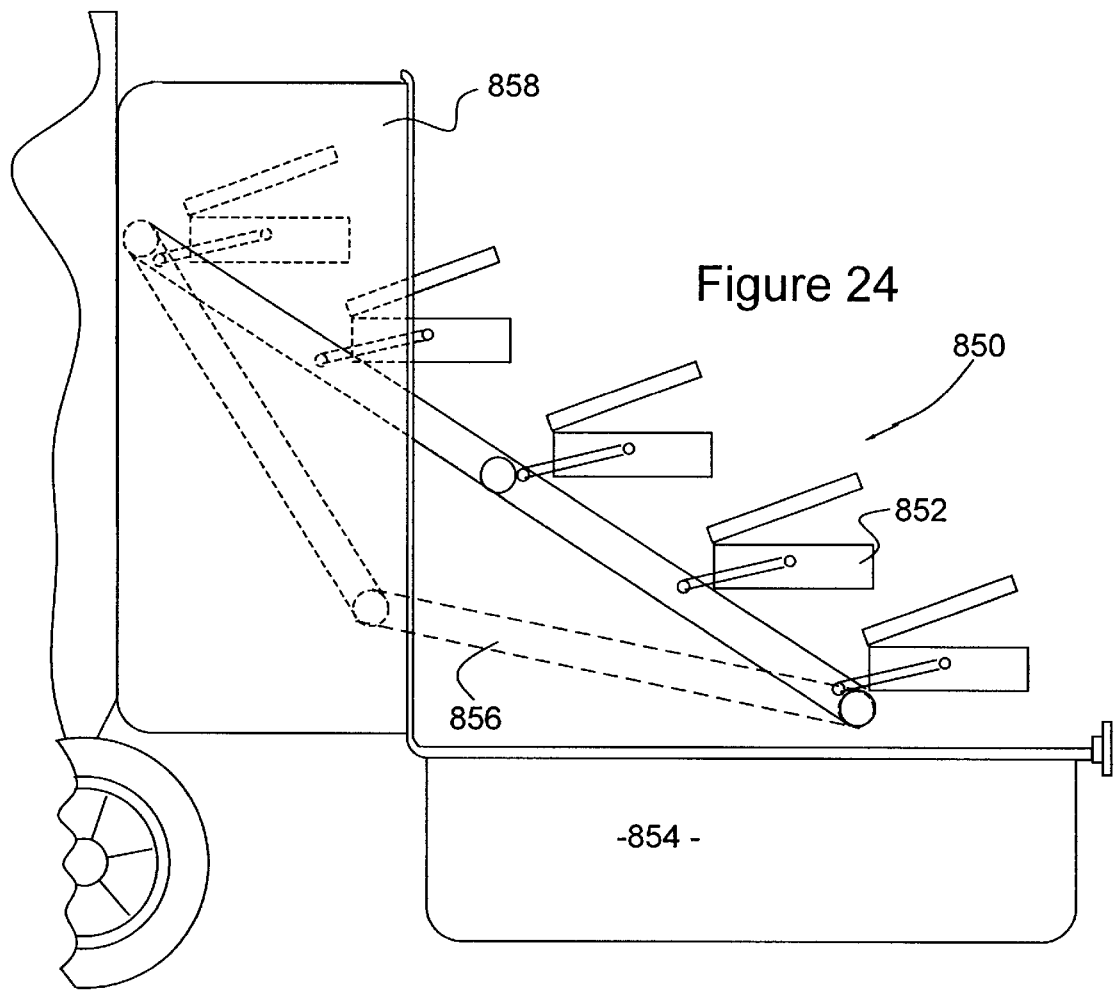
FIG. 24 is a side view of a drop down, multi-tray, case for use with the wheeled caddy.
Figure 25:
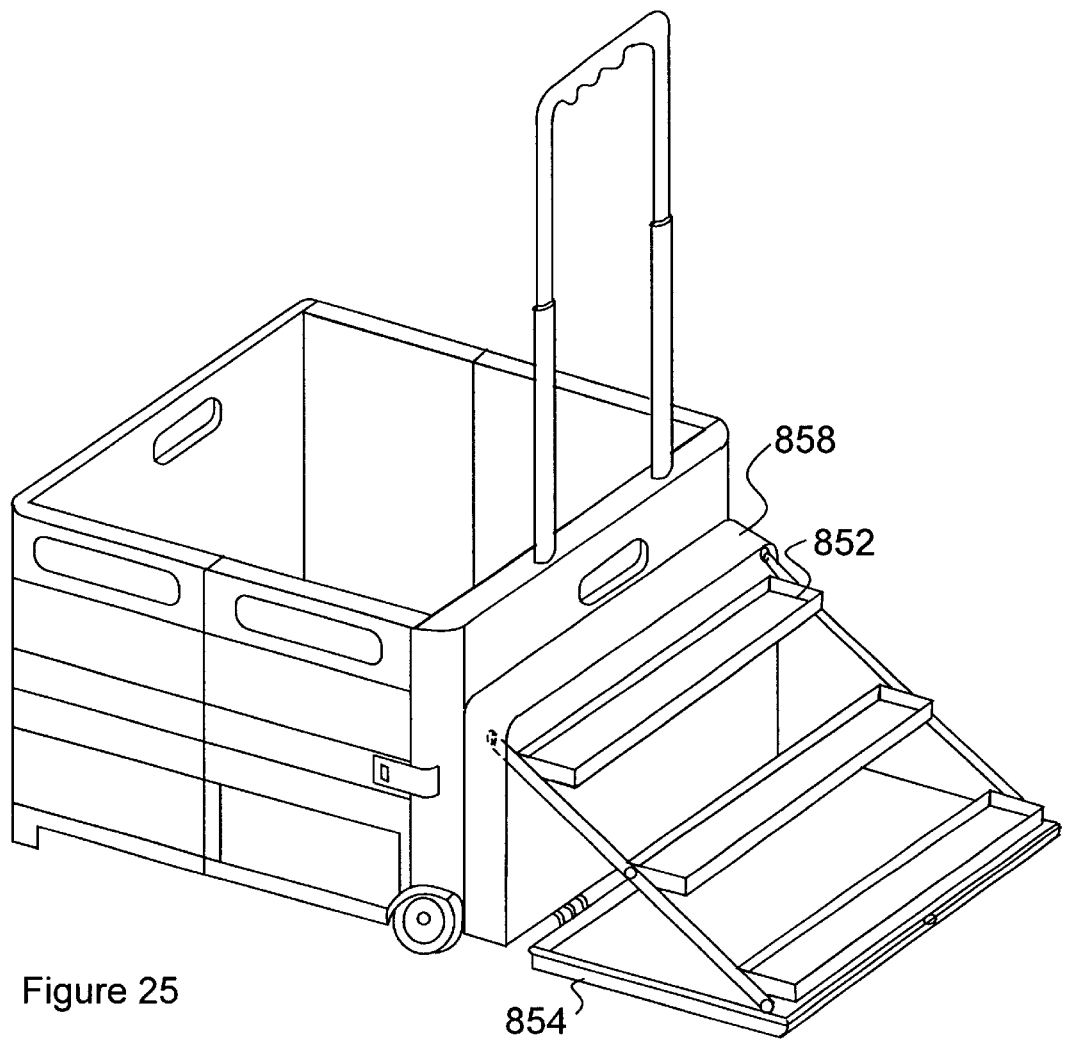
FIG. 25 is a perspective view of the drop down case of FIG. 24.
Figure 27:
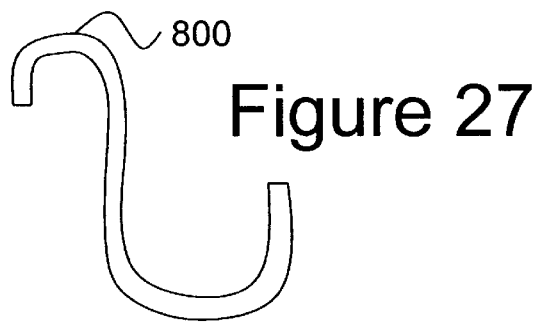
FIG. 27 is a side view of a helmet hook for use with the disclosed invention.

FIGS. 24 and 25, a fishing, or small tool, box 850 is added to the back of a wheeled caddy. The box 850 can be added either to the front or back of the caddy on a permanent basis or as a removable element. The box 850 is provided with a hinged 856 that folds into the box casing 858 as the lid 854 is closed. The tray 852 rotate on the brace 856 during opening and closing to enable the contents to be maintained within the trays. The box 850 can be sized to either take the maximum amount of space available on the caddy or can be a partial unit. In the illustrations herein, the box 850 is illustrated on the back of the caddy, however the box can also be placed on either the front or front and back of the caddy. The tray 852 must be spaced to permit the tray 852 to nestle within one another to permit the lid 854 to close. The pull down trays are known in the fishing box art and modification of the design will be obvious to those skilled in the art.

As the wheeled caddys are ideal for use with sports, a helmet hook 800 can be placed on the sides of the caddys. The hooks 800 when not in use, can be stored in the holders incorporated into the caddy. The hooks 800 should have sufficient size hold a helmet securely in place. The hooks can also be configured to receive tools, sporting items, etc.

Figure 31:
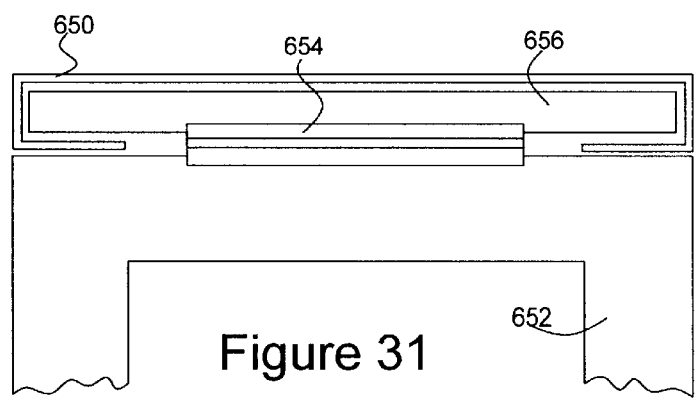
FIG. 31 is a top view of an alternate hinge design for the caddy lid.
Figure 32:
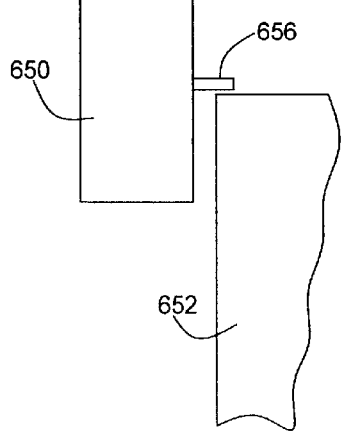
FIG. 32 is a side view of the hinge design of FIG. 31.

In FIGS. 31 and 32 an alternative method of affixing a lid the caddy is disclosed. The caddy 652 is provided with a hinged guide bar 656 that is affixed to the caddy 652 by one or more hinges 654. The lid 650 is a modified C-shape dimensioned to slideably receive the guide bar 656. The top and bottom of the lid 650 are closed to prevent the lid 650 from sliding off the bar 656, as well as for aesthetic purposes. The lid 650 is opened by lifting the lid 650 parallel to the caddy 652 and sliding the lid downward along the bar 656 to lie adjacent the front of the caddy 652.

Figure 34:
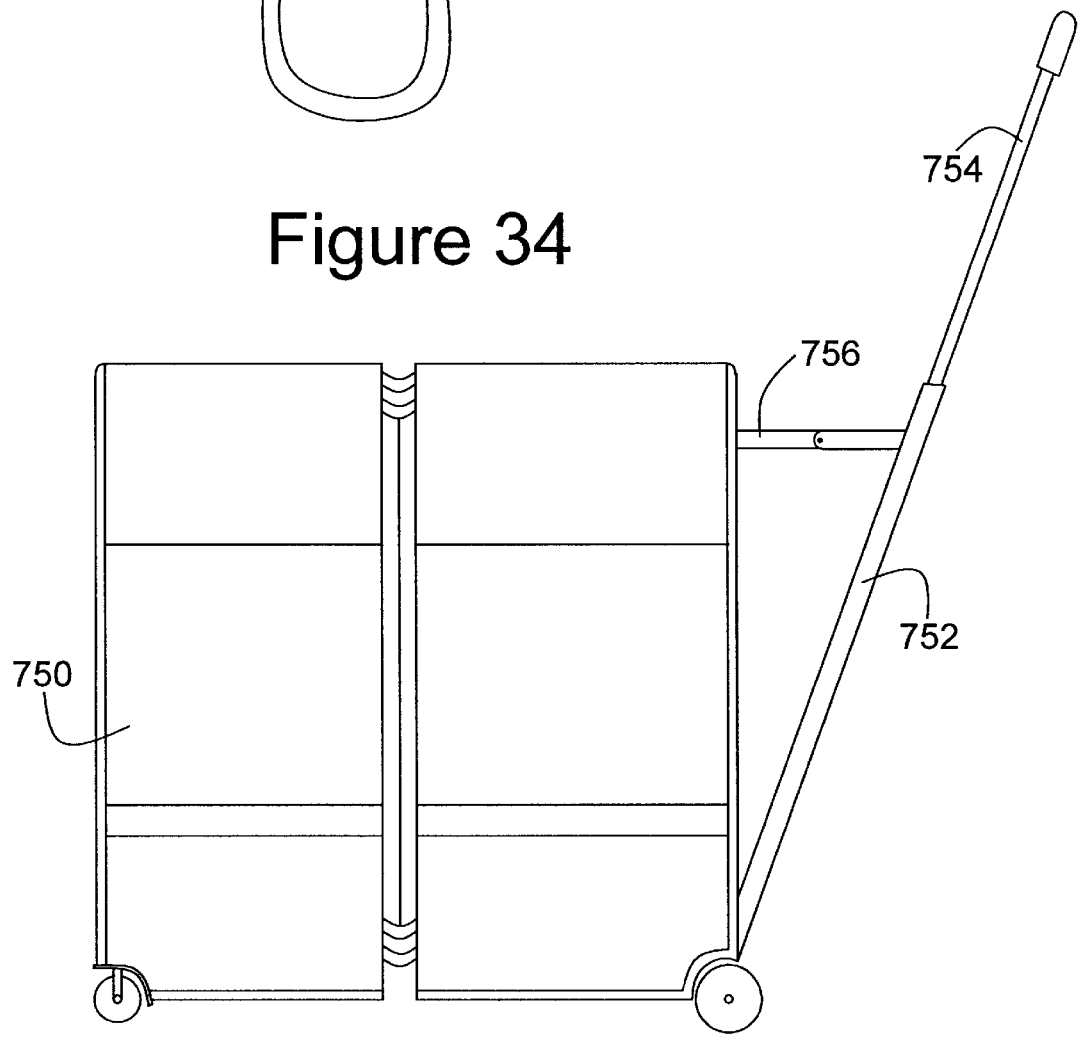
FIG. 34 is a side view of a front wheeled caddy having an pull-out handle system.
Figure 33:
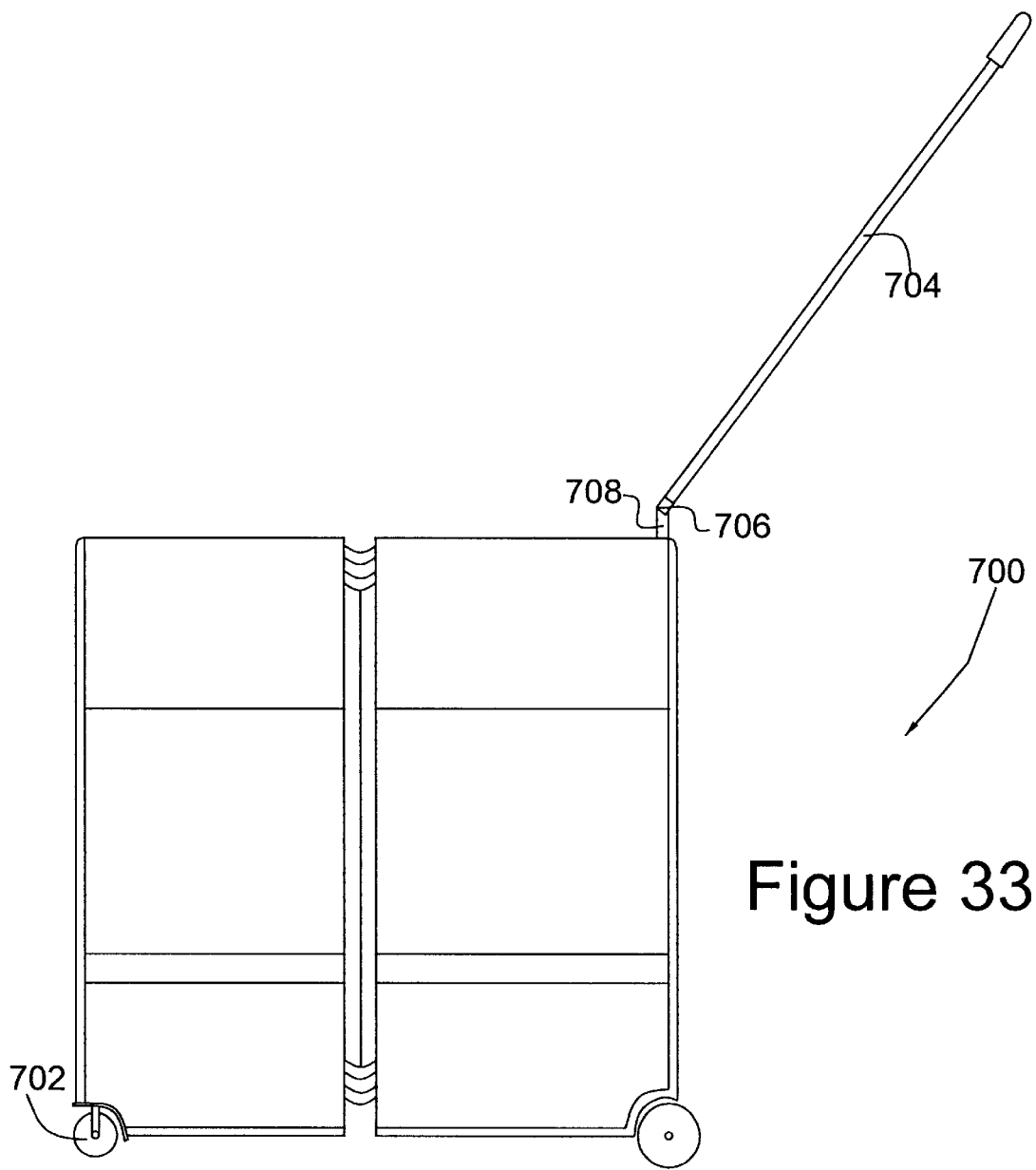
FIG. 33 is a side view of an alternate wheeled caddy having front wheels and an angled handle.

In FIG. 33, the caddy 700 has pivotable front wheels 702 have been added to enable the caddy 700 to be easily pushed. In order to facilitate pushing the caddy 700, the upper handle 704 is rotated at the joint 706. The joint 706 enables the upper handle 704 to rotate in relation to the bottom handle 708 while still enabling the handles 704 to telescope into the bottom handle 708 when released from the joint 706. In FIG. 34, the caddy 750 has a second back panel 752 that carries the handles 754. The second back panel 752 is prevented from separating from the caddy 750 more than the predetermined distance by a connector 756. The connector 756 can be two rotating bars that collapse as the second back panel 752 is brought adjacent the caddy 750, or other connectors such as a chain, rope, etc. The connector 756 must recess into either the caddy 750 or the second back panel 752 in order to enable the second back panel 752 to lie flush with the caddy 750. A locking member of a type known in the art, maintains the second back panel 752 in the vertical position.

Figure 35:
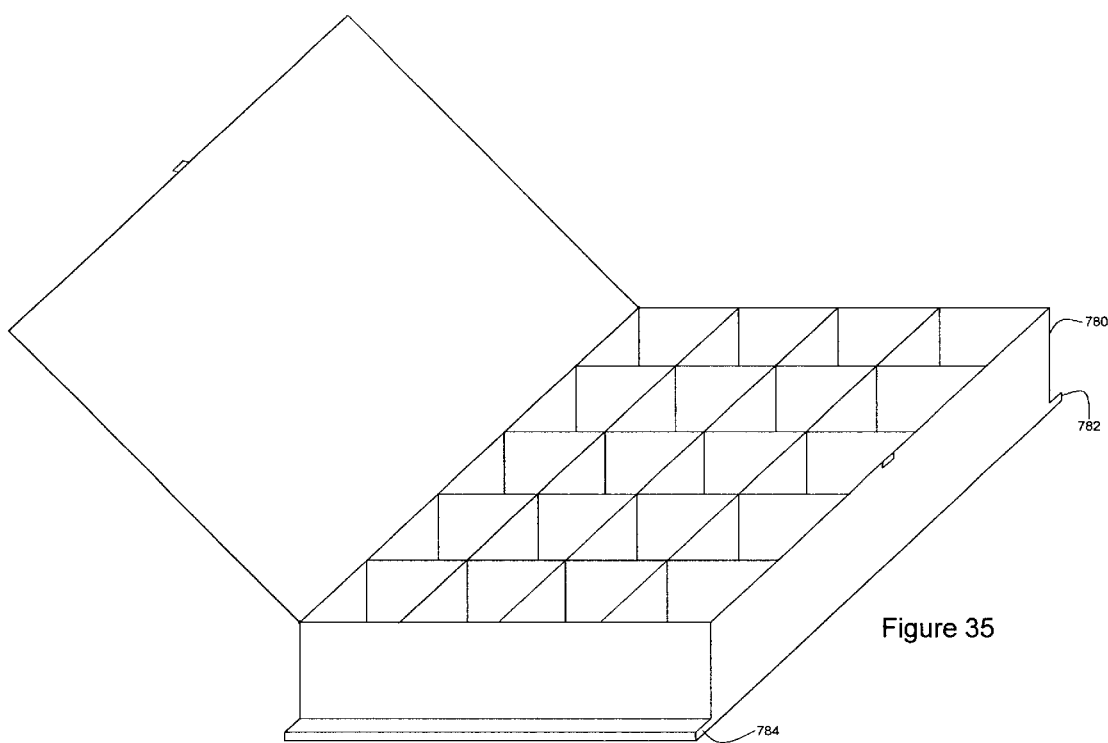
FIG. 35 is a perspective view of a storage box having flanges to interact with channels within the caddy.
Figure 36:
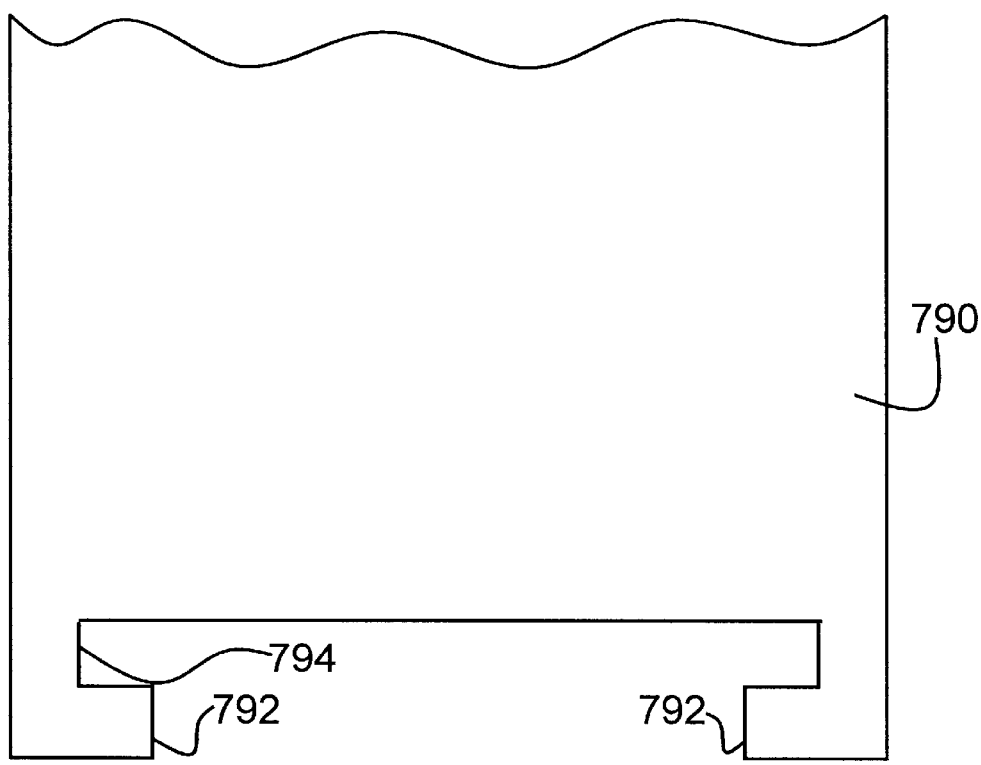
FIG. 36 is a top view of a caddy incorporating L-shaped slide channels incorporated into one of the exterior sides.
Figure 37:
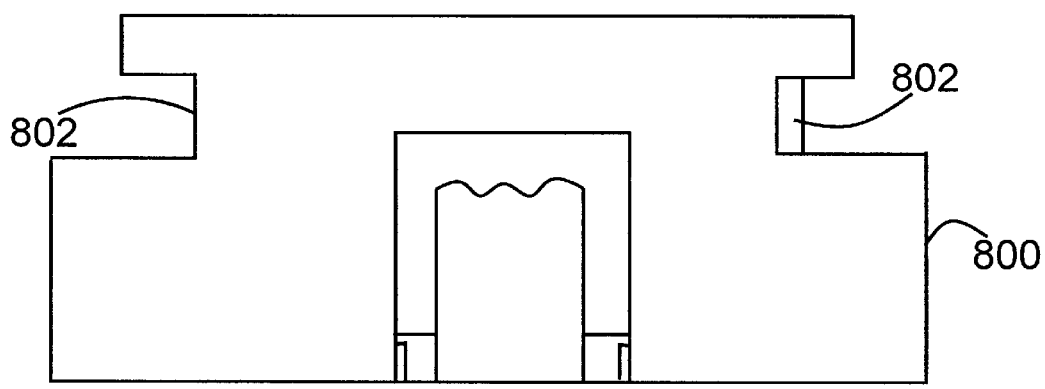
FIG. 37 is a top view of an alternate storage box having channels dimensioned to interact with the L-shaped slide channels of FIG. 36.

In FIG. 36 the caddy 790 is provided with a slide channel 794 formed by L-shaped lips 792. The slide channel 794 is dimensioned to receive the flanges 784 as illustrated on box 780 of FIG. 35. Alternatively, as illustrated in the box 800 of FIG. 37, the flange 782 can be replaced with channels 802 to interact with the L-shaped lips 792. Although a box is illustrated in these figures, the slide channel/flange combination can be incorporated with any add-on. The channels 802 can be molded into one or more of the four sides of the caddy, dependent upon final use. Further, either of the boxes 780 or 800 can be dimensioned to interact with the interior channels as described heretofore.

Figure 38:
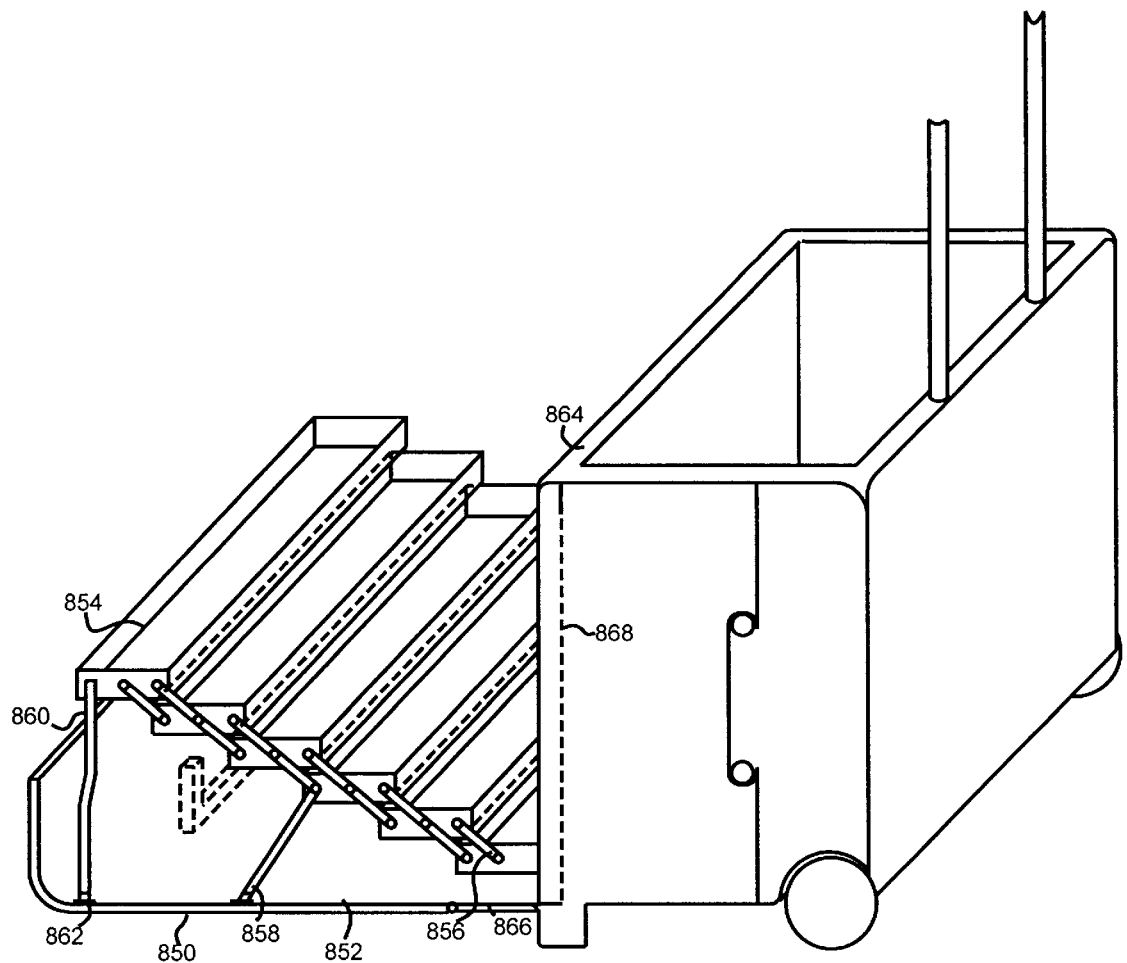
FIG. 38 is an perspective view of an alternate storage box in an open position.
Figure 39:
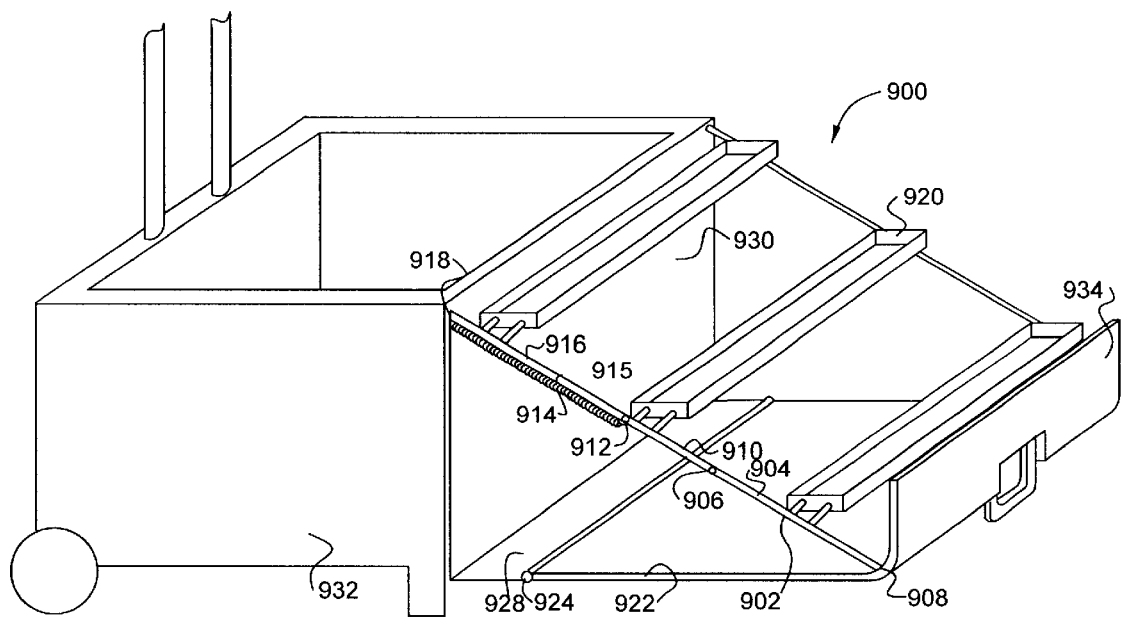
FIG. 39 is a perspective view of an alternate fold out storage box.
Figure 40:
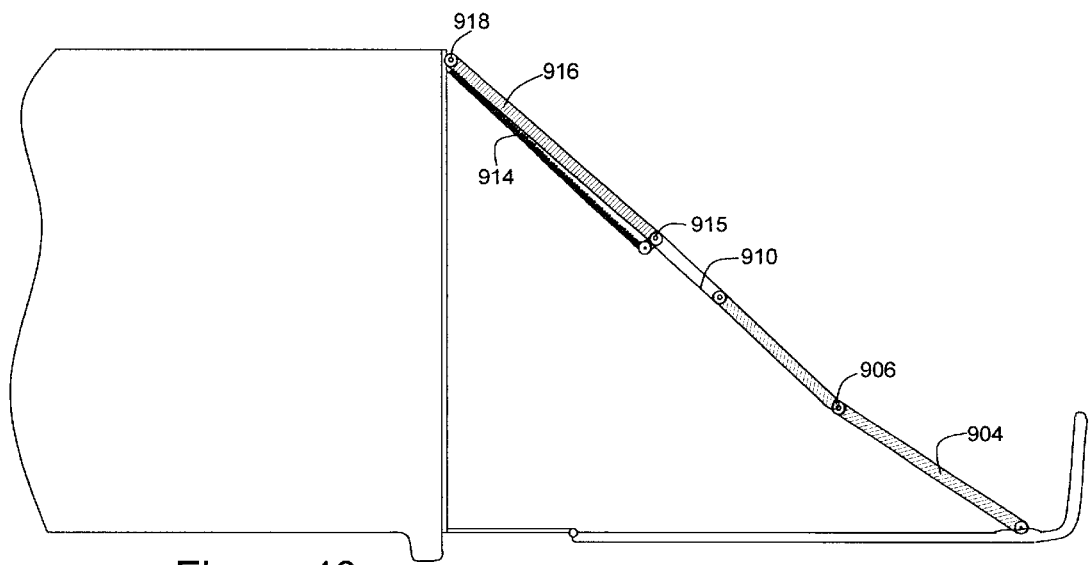
FIG. 40 is a side view of the hinge system of the storage box of FIG. 39 in the fully open position.
Figure 41:
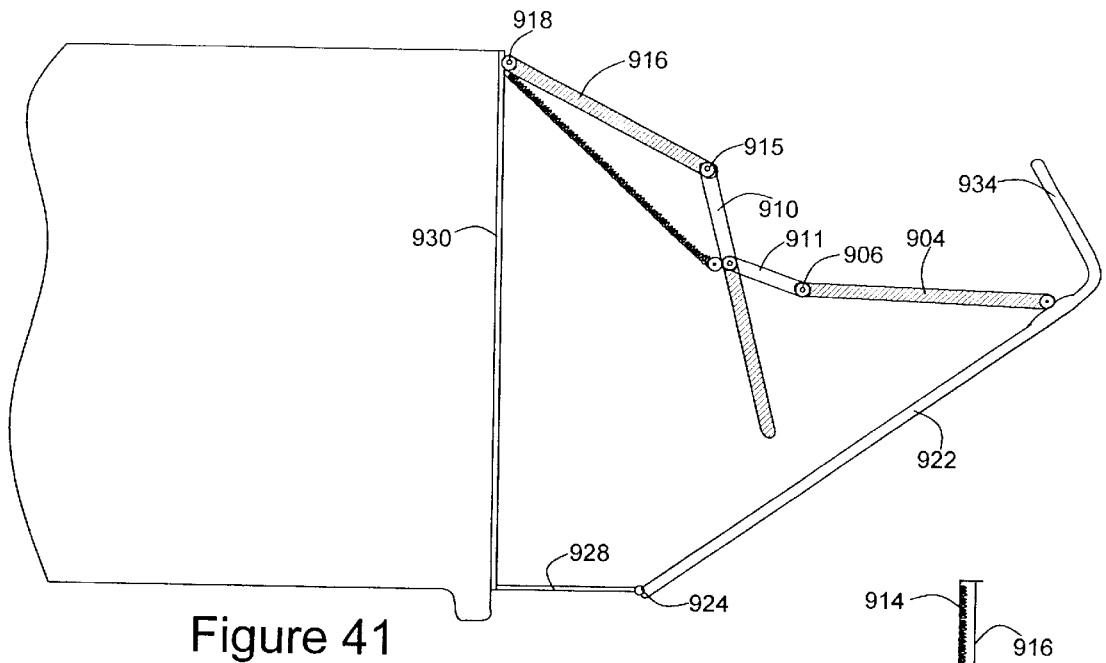
FIG. 41 is a side view of the hinge system of the storage box of FIG. 39 in a partially closed position.
Figure 43:
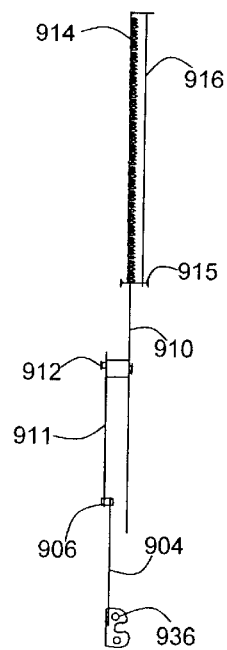
FIG. 43 is a top view of the hinge system of the storage box of FIG. 39 in the open position.
Figure 42:
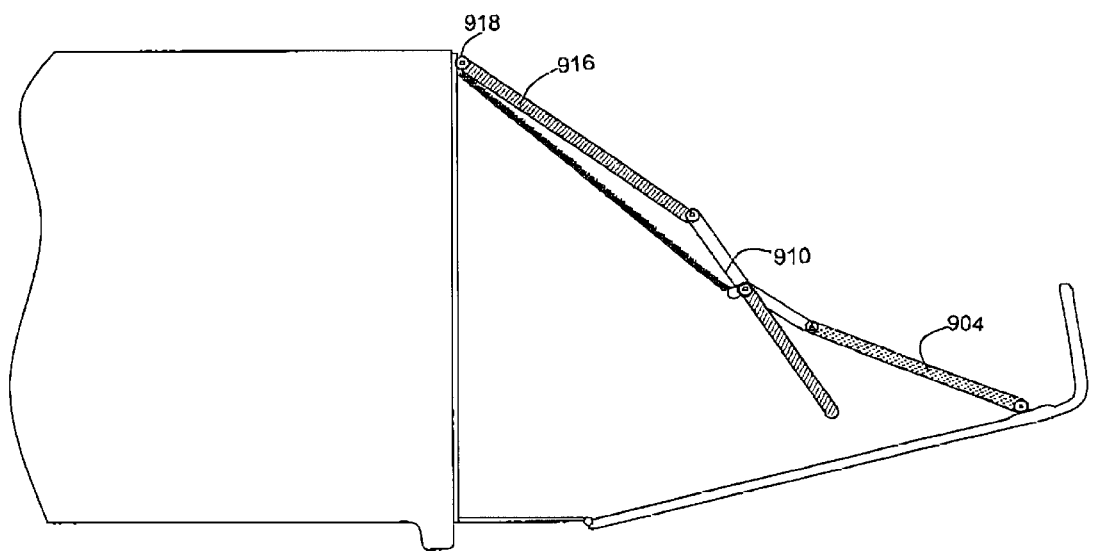
FIG. 42 is a side view of the hinge system of the storage box of FIG. 39 in a nearly open position.

In FIG. 38 an alternate pull down box 850 is illustrated wherein the lid 852 carries multiple trays 854. The trays 854 are connected to one another by multiple pivot rods 856. The upper tray 854 is supported, in the open position, by a back support rod 860 that extends from the upper tray 854 to the lid 852. A front support rod 858 is spans the distance between the trays 854 and the lid 852 at about the mid point to provide support in the middle of the unit and prevent sagging. The back support rod 860 is a single rod pivotally connected to the lid 852 at one end and the upper most tray 854 at the opposite end. Preferable the lid pivot 862, connected to the support rod 860, is designed to lock in place in the open position, requiring a slight amount of pressure to rotate to the closed position. The front support rod 858 also pivots at both the connection between the lid 852 and the tray 854. The pull down box 850, as illustrated herein, extends from the body 864 of the caddy. The bottom brace 866 has a width equal to or slight larger than the width of the bottom tray 854 in order to receive the trays 854. The lid 852 is L-shaped to extend over the top tray 854 and come in contact with the caddy body 864. In this embodiment, the back panel 868, full or partial, of the box 850 is removably attached to the caddy body 864. Other methods, such as brackets, that eliminate the use of a back panel can be used. Alternatively, the caddy can be manufactured with a receiving area to receive the trays, enabling the lid to be a flat piece of material.

In FIGS. 39–43, the pull down storage box 900 is either permanently or removably secured to the front of the caddy 932. The back panel 930 can be provided with channels or flanges, as disclosed heretofore, which enables the box 900 to be easily mounted and removed. The floor 928 and the lid 934 must have a width slightly greater than the trays 920 to enable the front panel 922 to close securely. The front panel 922 is hinged to the floor 928 through use of hinge 924. The trays 920 are secured to multiple, hinged, support bars that enable multiple trays 920 to vertically align, or stack, against the back panel 930.

The front bar 904 is pivotally connected at one end to the lid 922 through use of bracket 936. The other end of the front bar 904 is connected to the short bar 911 at the pivot 906. The short bar 911 is pivotally connected at the pivot 912 to the mid bar 910, which in turn is connected to the back bar 916 at pivot 915. The back bar 916 is also pivotally connected to the back panel 930 at the pivot 918. A spring 914 is affixed to the back panel 930, proximate the pivot 918, and to the mid bar 910, either at or proximate the pivot 912. The spring 914 assists in bringing the mid bar 910 toward the back panel, thereby enabling the lid 922 to close more easily.

In the closed position, the back bar 916 and mid bar 910 lie inline, flush with the back panel 930 while the front bar 904 is placed adjacent the back bar 916. The trays 920 must, therefore, be positioned to enable the trays 920 affixed to the front bar 904 to fit between the trays affixed to the back bar 916.

The examples herein are no intended in any way to limit the scope of the invention and it should be noted that any of the features can be combined, although not illustrated in conjunction with one another herein. The combination of features, alterations in materials and redesign of disclosed elements to fit a specific purpose will be evident to those skilled in the art.

What is claimed is:

1. A collapsible wheeled caddy having a front panel, a back panel, a first pair of wheels proximate said back panel, a first pair of vertically hinged side panels, a second pair of vertically hinged side panels, a hinged bottom panel and retractable handles within said back panel, said caddy having an outer periphery, the improvement comprising:

at least one in line rotatable securing strip, each of said at least one said rotatable securing strip having a first length and a second length, said second length being rotatable at least 270 degrees from said first length, said first length being affixed to said front panel, a lid, said lid being affixed to said second length of said rotatable securing strip, wherein said lid lies substantially parallel and flush with said front panel in an open position and adjacent a top edge of at least one of said back panel, said first pair of side panels, and said second pair of side panels in a closed position.

2. The caddy of claim 1 wherein said at least one second length of said securing strip is affixed to a lid bar, said lid bar being dimensioned to be received and slide within channels within said lid.

3. The caddy of claim 1 further comprising a recess within said front panel.

4. The caddy of claim 3 wherein said recess is configured to receive said lid within said recess, thereby enabling said lid to lie on the same plane as said front panel.

5. The caddy of claim 1 wherein said lid further comprises arcs, said arcs being positioned in an edge of said lid opposite said hinge and dimensioned to receive said handles when said lid is in said closed position.

6. The caddy of claim 3 wherein said width of said at least one in line hinged securing strip is dimensioned to space said lid from said recess thereby positioning said lid to lie adjacent said front panel.

7. The caddy of claim 3 further comprising at least one storage member, said storage member being dimensioned to be affixed within said recess.

8. The caddy of claim 3 further comprising a storage panel, said storage panel being configured to fit within said recess, said storage panel containing at least one storage member.

9. The caddy of claim 1 further comprising a pair of hangers, each of said hangers having:

a back support, said back support being configured to lie adjacent said vertically hinged side panels, a top plate, said top plate being at right angles to said back support, and a back panel, said back panel being at right angles to said top plate, wherein said dimensioning between said back panel and said back support form a snap fit over an edge of said hinged side panel.

10. The caddy of claim 9 wherein said hangers further comprise brackets, said brackets being L-shaped and extending at a right angle from said back panel, wherein a leg of said L-shaped bracket opposing said back panel retains items within said bracket.

11. The caddy of claim 9 wherein said back panel extends to said bottom panel.

12. The caddy of claim 11 further comprising retaining means, said retaining means removably affixing items to said back panel.

13. The caddy of claim 1 wherein edges of opposing panels of said caddy are notched to receive a support rod, said support rod supporting portions of said lid not lying adjacent an edge of said caddy.

14. The caddy of claim 1 further comprising at least one section divider, each of said at least one section divider being dimensioned to fit within said caddy thereby dividing said caddy into at least one smaller section.

15. The caddy of claim 14 further comprising at least one pair of channels, each of said pair of channels directly opposing one another and dimensioned to receive a section divider.

16. The caddy of claim 1 further comprising flexible holders, said flexible holders affixing to opposing sides of said caddy's exterior, thereby retaining items placed on said closed lid.

17. The caddy of claim 1 further comprising a stacking caddy, said stacking caddy having
   a front panel,
   a back panel, said back panel containing a handle recess, said handle recess being dimensioned to receive said retractable handles and having a handle retaining member, said handle retaining member preventing inadvertent removal of said retractable handles from said handle recess,
   a first pair of vertically hinged side panels,
   a second pair of vertically hinged side panels,
   a hinged bottom panel,
   a lid, said lid being hingeably affixed to said front panel edge, said lid lying proximate said front panel in an open position and adjacent a top edge of at least one of said back panel, said first pair of side panels, and said second pair of side panels in a closed position.

18. The caddy of claim 17 wherein said stacking caddy further comprises caddy receiving channels, said receiving channels being dimensioned to receive the edges of said wheeled caddy and preventing lateral movement between said stacking caddy and said wheeled caddy.

19. The caddy of claim 1 further comprising a spacer unit, said spacer unit having:
   a top receiving area, said top receiving area having wheel wells, alignment prongs and locking members, and
   a bottom receiving area, said bottom receiving area having a caddy receiving channel dimensioned to receive the top edges of a caddy, handle receiving area and locking members,
   wherein said bottom receiving area of said spacer unit is placed on a first caddy and locked to said caddy and a second wheeled caddy is placed in said top receiving area and locked to said spacer unit, said wheel wells receiving wheels from said wheeled caddy and said alignment prongs interacting with said top caddy to prevent lateral movement.

20. The caddy of claim 1 further comprising an equipment receiving area, said equipment receiving area being configured to receive and retain equipment and to enable said equipment to be used while in said receiving area.

21. The caddy of claim 1 wherein in said lid further comprises at least one storage member.

22. The caddy of claim 1 wherein at least one of said front panel and said back panel contain at least one storage area.

23. The caddy of claim 1 further comprising a pair of front wheels.

24. The caddy of claim 22 further comprising handle angle means, said angle means enabling said handle to lift to a predetermined position and angle upon reaching said predetermined position, thereby enabling said caddy to be pushed.

25. The caddy of claim 24 further comprising a hinged handle panel, said hinged handle panel being hinged along said back panel proximate said first pair of wheels and having retaining means, said retaining means preventing said hinged handle panel from extending beyond a predetermined distance, said hinged panel having telescoping means to maintain said handle.

26. The caddy of claim 1 wherein at least one of said front panel and said back panel further comprise a pair of opposing L-shaped lips, said L-shaped lips creating a channel to receive a slide panel.

27. The caddy of claim 26 wherein said slide panel is integral with a storage member, said storage member being mounted onto said caddy by sliding said slide panel into said channel.

28. The caddy of claim 9 wherein said bottom panel has at least one recessed area, said recessed area being dimensioned to receive and retain said hangers.

29. The caddy of claim 1 further comprising a flexible cover, said flexible cover having:
   a body, said body having a perimeter slightly greater than said caddy,
   a first height, said first height being equal to the height of said caddy,
   a flexible lid, said flexible lid being slit to form an open handle receiving area, said flexible lid being removable from at least a portion of said body, and an open end, said open end being opposite said lid.

30. The caddy of claim 29 wherein said cover further comprises a second height, said second height being flaps approximately equal to the height of said caddy.

31. The caddy of claim 30 wherein said cover further comprises attachment means, said attachment means individually securing each of said flaps to said body of said cover.

32. The caddy of claim 29 wherein said flexible cover further comprises a second height, said second height being equal to said caddy and having a periphery equal to said cover, at least one opposing open end of said second height having securing means, said securing means interacting with securing means on said first height open end.

33. The caddy of claim 1 further comprising a container case, said case being affixed to said caddy and having a hinged lid, said case containing multiple self-leveling containers, each of said containers being affixed to a rotatable brace, said rotatable brace folding to bring said containers within said case when said lid is closed and opening to extend said containers in an accessible manner when said lid is open.

34. The caddy of claim 33 wherein said rotatable brace has at least four bars, said bars being rotatably affixed to adjacent bars to form a bendable line, an unaffixed end of a first bar being affixed to said case's back and a fourth bar being affixed to said lid.

35. A collapsible wheeled caddy having a front panel, a back panel, a first pair of vertically hinged side panels, a second pair of vertically hinged side panels, a hinged bottom panel and retractable handles within said back panel, the improvement being:

at least one hinge, said at least one hinge each of said at least one hinge having a first securing strip, a second securing strip and rotatable hinge means connecting said first and second securing strips, said first securing strip being affixed to said front panel edge;

a lid, said lid being affixed to said second securing strip and having arcs, said arcs being positioned in an edge of said lid opposite said hinge and dimensioned to receive said handles when said lid is in said closed position, a recess, said recess being in said front panel and being dimensioned to accommodate said lid, a removable storage panel, said storage panel being configured to fit within said recess, said removable storage panel containing at least one storage member, a pair of removable hangers, each of said hangers having a back support configured to lie adjacent said vertically hinged side panels, a top plate at right angles to said back plate, a back panel at right angles to said top plate, and L-shaped brackets extending at a right angle from said back panel, wherein a leg of said L opposing said back panel retains items within said bracket, dimensioning between said back panel and said back support forming a snap fit over said hinged side panel edge, wherein said lid lies proximate said front panel in an open position and adjacent a top edge of at least one of said back panel, said first pair of side panels, and said second pair of side panels in a closed position.

* * * * *